United States Patent [19]

Eager et al.

[11] Patent Number: 5,960,200
[45] Date of Patent: Sep. 28, 1999

[54] SYSTEM TO TRANSITION AN ENTERPRISE TO A DISTRIBUTED INFRASTRUCTURE

[75] Inventors: Timothy Eager, Fullerton, Calif.; Madhav Anand, Cambridge, Mass.; Edouard Aslanian, Hermosa Beach, Calif.

[73] Assignee: i-CUBE, Cambridge, Mass.

[21] Appl. No.: 08/714,205

[22] Filed: Sep. 16, 1996

Related U.S. Application Data

[60] Provisional application No. 60/016,330, May 3, 1996.

[51] Int. Cl.$^6$ ........................................................ G06F 9/45
[52] U.S. Cl. .......................... 395/705; 395/701; 395/707; 395/500; 395/200.31; 705/7
[58] Field of Search ................................. 395/705, 701, 395/702, 707, 708, 500, 200.31, 200.33, 682, 683; 705/7–11; 707/10, 100, 102–104; 364/578, 468.02, 468.03, 468.05, 468.09

[56] References Cited

U.S. PATENT DOCUMENTS

| | | | |
|---|---|---|---|
| 5,119,465 | 6/1992 | Jack et al. ................................. | 395/500 |
| 5,228,137 | 7/1993 | Kleinerman et al. .................... | 395/500 |
| 5,455,948 | 10/1995 | Poole et al. ............................. | 707/102 |
| 5,457,797 | 10/1995 | Butterworth et al. .................. | 395/682 |
| 5,524,253 | 6/1996 | Pham et al. ......................... | 395/200.32 |
| 5,606,697 | 2/1997 | Ono ........................................ | 395/707 |

OTHER PUBLICATIONS

Callahan, J.R., et al., "A Packaging System For Heterogeneous Execution Environments," *IEEE Transactions on Software Engineering*, 17(6):626–635, (Jun. 1991).

Scandura, J.M., "Converting Legacy Code into Ada: A Cognitive Approach," *IEEE*, 27(4):55–61, (Apr. 1994).

Berg, K.S., "Business Objects Done Right," *Software Reviews*, 20(4):175–176, (Apr. 1995).

Ladd, D.A., et al., "A*: a Language for Implementing Language Processors," *IEEE*, pp. 1–10, (1994).

Leymann, F., et al., "Business Process Management With FlowMark," *IEEE*, pp. 230–234, (1994).

Tumminaro, J., Old School: 3R's New School: R/3, *InformationWeek*, pp. 50–54, (Apr. 1995).

Bartholomew, D., "SAP America's Trojan Horse," *Informationweek*, pp. 37–46, (Apr. 1995).

Tumminaro, J., "Forté Leads 3–Tier Pack," *Informationweek*, pp. 54–59, (May 1995).

Baum, D., "Three Tiers For Client–Server," *Informationweek*, pp. 42, 44, 48–49 and 52, (May 1995).

Maskell, K., "Building Software Bridges," *Systems International*, pp. 63–64, (Jan. 1987).

Ahuja, G.S., et al., "Role of Relational Data Base Management System An Client/Server Technology In EMS Migration," comprising 7 pages.

Moore, M., et al., "Knowledge–based User Interface Migration," *IEEE*, pp. 72–79, (1994).

Geschickter, C., "A Commonsense Plan for Client–Server Migration," *Data Communications*, pp. 73–76 and 78, (May 1994).

(List continued on next page.)

*Primary Examiner*—Tariq R. Hafiz
*Assistant Examiner*—Tuan Q. Dam
*Attorney, Agent, or Firm*—Hamilton, Brook, Smith & Reynolds, P.C.

[57] ABSTRACT

An automated system transitions an entire enterprise to a distributed infrastructure. The system includes a process for organizing and managing the transition, a multi-tiered client/server architecture that adheres to open systems standards, a system to automate the transition of existing applications to this architecture, and a system to enable the creation or modification of applications based on this architecture.

54 Claims, 36 Drawing Sheets

OTHER PUBLICATIONS

Mackey, S.R., et al., "Software Migration and Reengineering (SMR) A Pilot Project in Reengineering," pp. 178–191.

Mittra, S.S., "A Road Map for Migrating Legacy Systems to Client/Server," Software Maintenance: Research and Practice, vol. 7, pp. 117–130, (1995).

"DASE—Base Technology for Data and Applications Software Evolution and HIREL HIerarchical to RELational for an automated Migration to an open, relational and Client/Server positioned Environement," SWS Software Services, pp. 1–4, (1994).

"DASE Base Technology for Data and Acquisitions Software Evolution and HIREL/AProp IMS/DB–DB2 dual way Access Propagation for an automated Migration to an open, relational and Client/Server positioned Environment," SWS Software Services, pp. 1–4, (1994).

"DASE Base Technology for Data and Applications Software Evolution and IXREL IBM hIerarchisch to uniX RELational for an automated Migration to an open, relational and Client/Server positioned Environment," SWS Software Services, pp. 1–4, (1994).

"DASE Base Technology for Data and Applications Software Evolution and CMP COBOL Migration Products for an automated Migration from COBOL ANS'68/74 to COBOL ANS'85 and REPORT WRITER to Native COBOL," SWS Software Services, pp. 1–4, (1994).

"DASE Base Technology for Data and Acquisitions Software Evolution and VREL Vsam to RELational for an automated Migration to an open, relational and Client/Server positioned Environment," SWS Software Services, pp. 1–4, (1994).

┌─ 221

MOVE LOW-VALUE TO FLAG-AREA YMS-CALL_RESULTS. 221-A
IF YMS-CALL-AREA > 9000 221-B
  MOVE 'N' TO YMS-CALL-ERROR 221-C
  GO TO 0099-FIN. 221-D
MOVE 0 TO BIT-NUM. 221-E
MOVE YMS-CALL-VT TO HOLD-CALL-VT. 221-F
IF HOLD-CALL-VT-2-NUM = 0 221-G
  MOVE SPACE TO HOLD-CALL-VT-2-CHAR. 221-H
PERFORM 1000-FIND-COMMON-BANK. 221-I
IF NOT END-PROGRAM 221-J
  IF YMS-CALL-ERROR > SPACE 221-K
    NEXT SENTENCE 221-L
  ELSE 221-M
    PERFORM 2000-SEARCH-INDEX. 221-N
0099-FIN. 221-O

VMS-CALL-RESULT VAR FLAG-AREA VAR VARLIST LOW-VALUE VAR ASSIGN STATEMENT 225-1'

YMS-CALL-AREA VAR 9000 LITERAL GREATER-THAN CONDITION YMS-CALL-ERROR VAR N LITERAL ASSIGN STATEMENT 0099-FIN LABEL JUMP STATEMENT STATEMENT-LIST IF STATEMENT 225-2'

BIT-NUM VAR 0 LITERAL ASSIGN STATEMENT 225-3'

HOLD-CALL-VT VAR YMS-CALL-VT VAR ASSIGN STATEMENT 225-4'

HOLD-CALL-VT-2-NUM VAR 0 LITERAL EQUAL CONDITION HOLD-CALL-VT-CHAR VAR SPACE LITERAL ASSIGN STATEMENT-LIST IF STATEMENT 225-5'

1000-FIND-COMMON-BANK VAR EXECUTE STATEMENT 225-6'

END-PROGRAM VAR NOT CONDITION YMS-CALL-ERROR VAR SPACE LITERAL GREATER-THAN CONDITION 0099-FIN LABEL JUMP STATEMENT STATEMENT-LIST 2000-SEARCH-INDEX VAR EXECUTE STATEMENT STATEMENT-LIST IF-ELSE STATEMENT-LIST IF STATEMENT 225-7'

0099-FIN LABEL STATEMENT 225-8'

STATEMENT-LIST STATEMENT-LIST STATEMENT-LIST STATEMENT-LIST STATEMENT-LIST STATEMENT-LIST STATEMENT-LIST STATEMENT-LIST 225-9'

```
ASSIGN (YMS_CALL_RESULTS, LOW_VALUE);
ASSIGN (FLAG_AREA, LOW_VALUE);
IF (IsGreaterThanLiteral (YMS_CALL_AREA, 9000))
{
   AssignFromLiteral (YMS_CALL_ERROR, "N");
   goto LABEL_0099_FIN.
}
AssignFromLiteral (BIT_NUM, "O");
ASSIGN (HOLD_CALL_VT, YMS_CALL_VT);
IF (IsEqualToLiteral (HOLD_CALL_VT_2_NUM, 0))
{
   AssignFromLiteral (HOLD_CALL_VT_2_CHAR, " ");
}
FUNC_1000_FIND_COMMON_BANK ();
IF (! IsTrue (END_PROGRAM))
{
   IF (IsGreaterThanLiteral (YMS_CALL_ERROR," "))  ⟵ 227'
   {
      goto gen_label_1;
   }
   ELSE
   {
      FUNC_2000_SEARCH_INDEX ();
   }
   gen_label_1: /* NEXT SENTENCE */
}
LABEL_0099_FIN:
```

FIG. 23A

```
YMS_CALL_RESULTS = FLAG_AREA = LOW_VALUE;
IF (YMS_CALL_AREA > 9000 )
{
    YMS_CALL_ERROR = "N";
    goto LABEL_0099_FIN;
}
BIT_NUM = 0;
HOLD_CALL_VT = YMS_CALL_VT;
IF (HOLD_CALL_VT_2_NUM ==0 )
{
    HOLD_CALL_VT_2_CHAR = " ";
}
FUNC_1000_FIND_COMMON_BANK ();
IF (! END_PROGRAM)
    IF ((YMS_CALL_ERROR > " ")
    {
        goto gen_label_1;
    }
    ELSE
    {
        FUNC_2000_SEARCH_INDEX ();
    }
gen_label_1: /* NEXT SENTENCE */
LABEL_0099_FIN
```

SYSTEM TO TRANSITION AN ENTERPRISE TO A DISTRIBUTED INFRASTRUCTURE

RELATED APPLICATIONS

This application claims priority to U.S. Provisional Application No. 60/016,330 filed on May 3, 1996, the teachings of which are incorporated herein by reference in their entirety.

BACKGROUND

Corporations characteristically use applications executing on computer systems to automate their business functions. The applications typically contain parts that deal with the user interface, parts that deal with business processes, parts that deal with programming logic, and parts that deal with data. The applications are typically built to operate on a single computer platform. In this context, a computer platform includes the programs, or software, to perform the various tasks required of a computer, as well as the machine, or hardware, that hosts these programs.

Given the large amount of business functions that need to be automated within a corporation, applications are often centralized on one single platform. From a hardware point of view, such platforms include large and powerful computers such as mini-computers or mainframes. On the software side, such platforms often take the form of all-encompassing environments that meet all of the application development needs, such as Information Management System/Virtual Storage (IMS/VS) from International Business Machines Corporation (IBM). In the IMS/VS model, the various conceptual layers constituting an application are bundled together in one single piece or a small number of inter-dependent pieces. This single-tier model is well understood, reliable, and secure. It facilitates control and limits overhead.

The proprietary nature of the host platform, however, leads to severe economic disadvantages. Initial platform costs are sizable, and subsequent growth is limited by the capacity of the hardware and software components of the platform that hosts the application. Furthermore, application maintenance and enhancement is a complex and cumbersome process. Application users are removed from application developers, increasing the gap between requirements and implementation. Changes to one part of the application also require compatible changes to the other parts of the application. Finally, data access and communication standards are limited to those supported by the host platform.

The advent of desktop computing in the form of the personal computer provides an initial solution to the above problems by enabling corporations to depart from the centralized platform model. To maximize the usage of their computer resources, applications can be distributed among different platforms. This distributed system approach can take many forms, the most widespread of which is known as the two-tiered client/server architecture. This two-tiered model divides the application between two platforms: a client and a server. At a high level, clients and servers are software concepts. A client makes requests from servers, while servers provide adequate services to fulfill client requests. Client hosts are typically personal computers, while server hosts are typically mini-computers or mainframe computers.

In the client/server model, the presentation part of the application is usually located on the client platform and the data part of the application is found on the server platform, with the business process and functionality parts of the application merged into either of the other two layers. This model is more economical than the single-tier model, with less or no hardware lock-in. The division into two tiers is also more flexible to user interface changes. On the other hand, the proprietary nature of the platform is still present at the level of the software.

SUMMARY OF THE INVENTION

Even in the two-tiered client/server model, the mixing of functionality with either presentation or data still leads to complicated code changes. Also, data access and communication standards are still limited. Furthermore, enterprises have no facilities to transition their existing infrastructure to a distributed computing model.

A preferred embodiment of the invention includes a system to transition an entire business enterprise to a distributed infrastructure. The distributed infrastructure is preferably a multi-tiered client/server target architecture that adheres to open system standards. The multi-tiered architecture preferably includes at least four layers including a separate process control layer and functionality layer. The process control layer includes a state router to control work flow in accordance with the business procedures of the enterprise. The functionality layer includes modules for performing the work. The architecture also preferably includes a presentation layer for interfacing with a user, and a data retrieval layer for accessing data stored in a separate data storage layer.

A transition of an entire business enterprise to a distributed infrastructure based on the new architecture is performed using a process for organizing and managing the transition. Notably, this requires that each legacy (source) application be identified and prioritized. For each source application, there are a range of available transition choices, including the option of translating the source application to the new target architecture without changing any of the existing functionality and the option of re-engineering the source application by changing the existing functionality. The source application may also be replaceable by a commercial product or a custom application written in-house. The source applications are then transitioned in order of priority to the new architecture.

Specifically, a preferred system in accordance with the present invention includes the automated capability to translate existing source applications into new target applications on a multi-tiered client/server architecture. The translation of source applications to target applications includes the conversion of user interfaces, procedural languages, and data definitions. These conversions use a two-phase process where source program components written in the source languages are first translated to components in a common intermediate language. The intermediate language components are then translated to target program components in the target languages. By using a common intermediate language, only one translation module is required for each source and target language.

A preferred system in accordance with the present invention further includes a facility to create a new application based on the multi-tiered client/server architecture and to modify an existing application that already uses this multi-tiered client/server architecture.

BRIEF DESCRIPTION OF THE DRAWINGS

The foregoing and other objects, features and advantages of the invention, including various novel details of construction and combination of parts will be apparent from the following more particular drawings and description of preferred embodiments of a system to transition an enterprise to a distributed infrastructure in which the reference characters refer to the same parts throughout the different views. It will be understood that the particular apparatus and methods embodying the invention are shown by way of illustration only and not as a limitation of the invention, emphasis instead being placed upon illustrating the principles of the invention. The principles and features of this invention may be employed in various and numerous embodiments without departing from the scope of the invention.

FIG. 18 is an exemplary source code fragment.

FIG. 21 is an intermediate language file for the source code fragment of FIG. 18.

FIGS. 23A–23B are C and C++ target code fragments there being source code fragment of FIG. 18.

DETAILED DESCRIPTION OF THE PREFERRED EMBODIMENT

Figure 1:
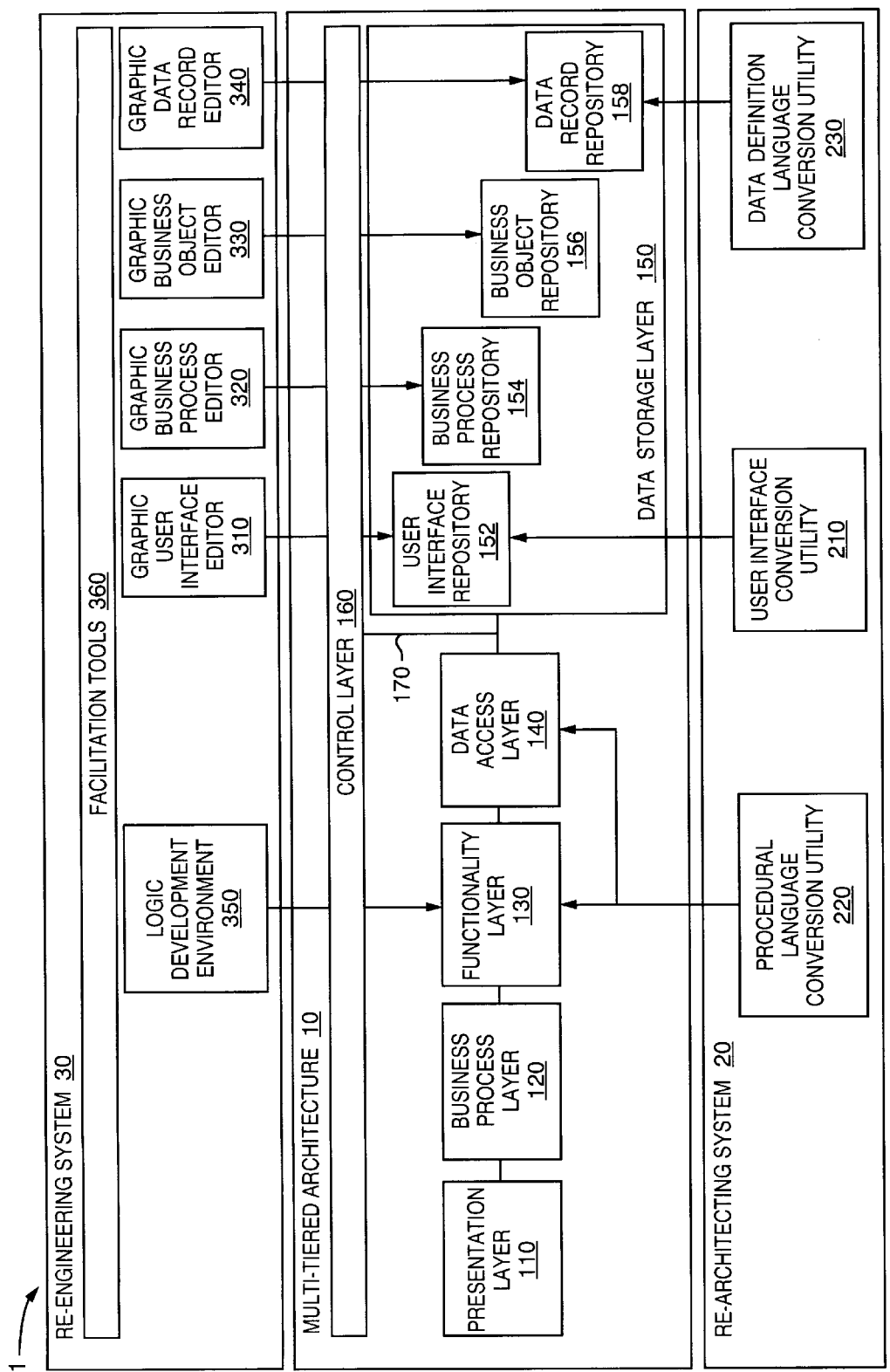
FIG. 1 is a high level block diagram of a system embodying the invention.

FIG. 1 is a high level block diagram of a system embodying the invention. As shown, the system 1 includes a multi-tiered architecture 10, a re-architecting system 20 for converting source applications of an enterprise to target applications on the multi-tiered architecture 10, and a re-engineering subsystem 30 for custom application development or re-engineering.

A preferred multi-tiered architecture 10 of the present invention comprises at least four separate layers. As illustrated, the architecture 10 includes at least one presentation layer 110, one separate business process layer 120, one separate functionality layer 130, one separate data access layer 140, one separate data storage layer 150, and one separate control layer 160, all inter-connected through communication links 170. The data storage layer 150 preferably includes a user interface repository 152, a business process repository 154, a business object repository 156, and a data record repository 158 for storing data.

A preferred re-architecting system 20 includes a user interface conversion utility 210, a procedural language conversion utility 220, and a data definition language conversion utility 230. The procedural language conversion utility 220 is in communication with the functionality layer 130 and the data access layer 140 of the multi-tier architecture 10. The user interface conversion utility 210 is in communication with the user interface repository 152 and the data definition language conversion utility 230 is in communication with the data record repository 158.

A preferred re-engineering system includes a graphical user interface editor 310, a graphical business process editor 320, a graphical business object editor 330, a graphical data editor 340, a logic development environment 350, and facilitation tools 360. The logic development environment 350 is in communication with the functionality layer 130 of the multi-tier architecture 10. The graphical user interface editor 310, the graphical business process editor 320, the graphical business object editor 330, and the graphical data record editor 340 are in communication with the user interface repository 152, the business process repository 154, the business object repository 156, and the data record repository 158, respectively.

Even though the re-engineering system 30 is an integral part of the overall system of the present invention, it is not part of the actual transition of an enterprise to a distributed infrastructure. Instead, the re-engineering system 30 enables the enterprise to maintain and enhance its distributed infrastructure once the transition itself is complete.

In its simplest form, a host for all the layers can be a single platform. At the other end of the spectrum, each layer can be hosted on a different platform. In the spirit of distributed systems, a preferred embodiment of the present invention hosts each layer on a separate platform, both in terms of hardware and software. In a preferred embodiment of the present invention, the architecture 10 supports both custom-developed applications as well as application converted from a legacy system. The IMS/VS legacy environment is used herein to illustrate, but not limit, architectural concepts that pertain to a converted legacy application.

Figure 2:
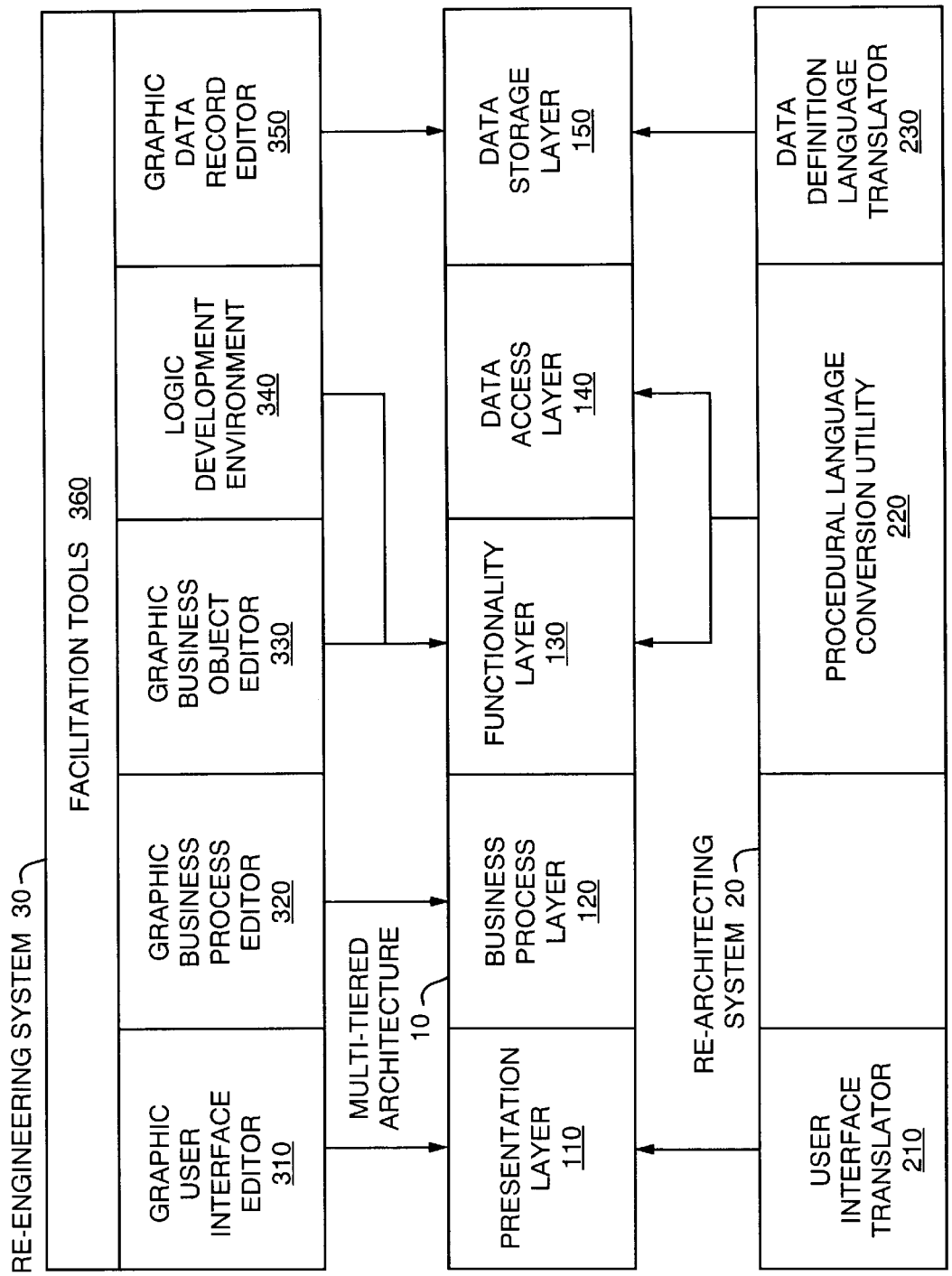
FIG. 2 is a functional block diagram of the interrelationships of FIG. 1.

FIG. 2 is a functional block diagram of the interrelationships of FIG. 1. Conceptually, the user interface translator 210 and the graphic user interface editor 310 affect the presentation layer 110 of the multi-tiered architecture 10. The graphical business process editor 320 affects the business process layer 120. The procedural language conversion utility 220, the graphical business object editor 330, and a logic development environment 350 conceptually affect the functionality layer 130. The procedural language conversion utility 220 also conceptually affects the data access layer 140. The data definition language translator 230 and the graphical data record editor 340 conceptually affect the data storage layer 150.

Figure 3:
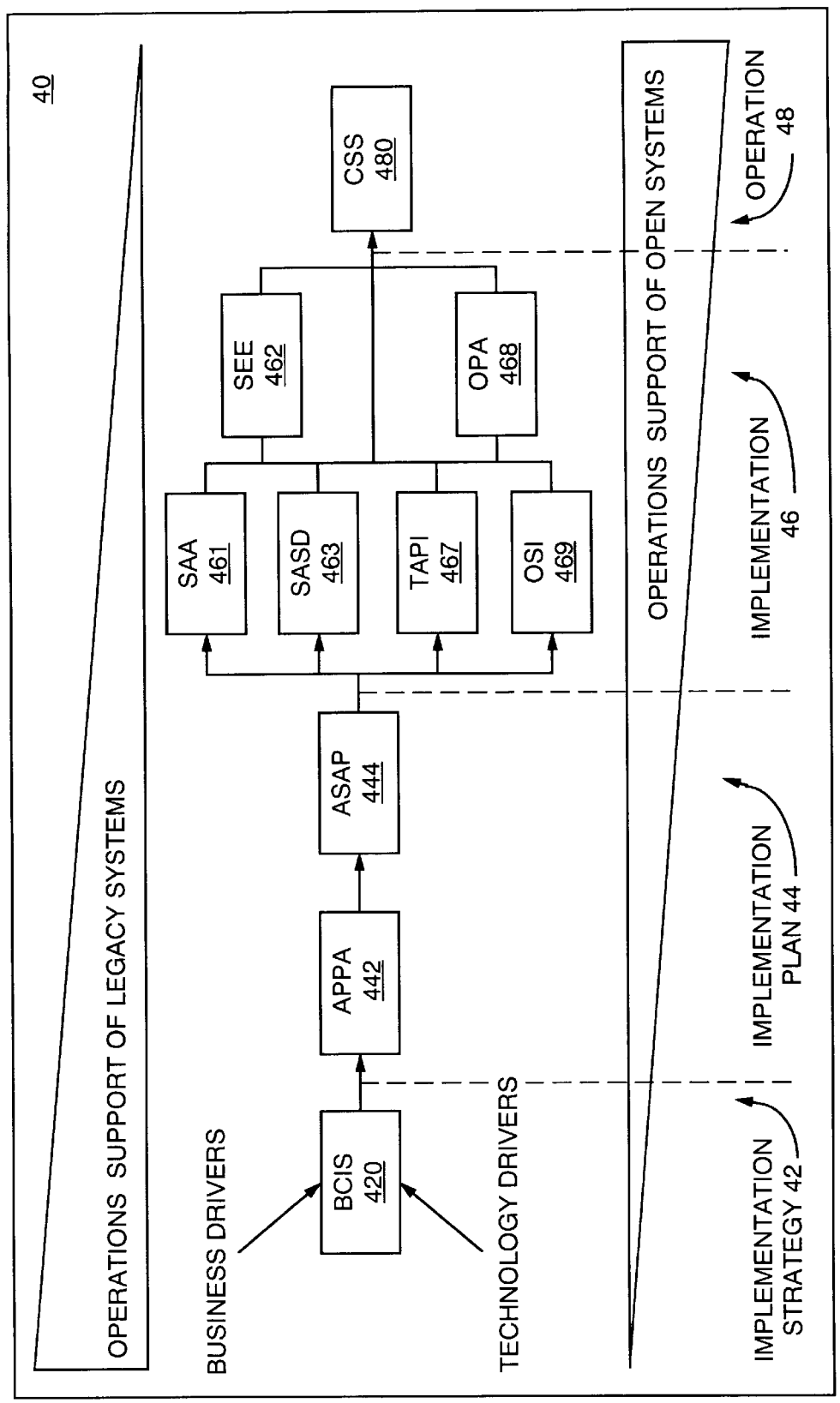
FIG. 3 is a schematic block diagram of a process for managing the transition of an entire enterprise to a distributed infrastructure.

FIG. 3 is a schematic block diagram of a preferred process for managing the transition of an entire enterprise to a distributed infrastructure. Preferably, the transition management process 40 includes a series of high level serial stages, including an implementation strategy stage 42, an implementation planning stage 44, a system implementation stage 46, and an operation stage 48. As the transition management process 40 proceeds from the implementation strategy stage 42 through to the operation stage 48, the amount of operations support required by the legacy system decreases and the amount of operations support for the open system increases, as illustrated.

The implementation strategy stage 42 is a sequence of manual steps embodied in a Business Case and Implementation Strategy (BCIS) process 420. The BCIS process 420 determines the business and technology drivers of the enterprise, builds a business case analysis of the economic feasibility of the transition, and creates an implementation strategy that provides the basic outline of the organization of the transition. This can involve studies of the existing and envisioned organization, infrastructure, and technology, as well as an evaluation of the impact of the transition in these areas. A study of the organization analyzes methods for developing the skills necessary for the transition and to manage potential resistance to change. A study of the infrastructure analyzes the hardware, software, and network required to support the transition. A technology study analyzes the tools, architectures, and other technologies necessary for the transition. Although the implementation strategy stage 42 is described as a manual process, an expert system can be employed to perform some or all of the processing.

More specifically, the focus is first to define the current state of the enterprise, which provides the start point. This start point is defined through an assessment of the performance of the existing information technology in supporting current business goals, an assessment of the readiness of the organization to build and support a new environment, and an assessment of the limitations inherent to the existing infrastructure.

The next focus is to identify the mission of the enterprise. The mission will give a good idea of the on-going direction of the enterprise, with which all undertakings must be aligned. Once the mission is identified, a conceptual vision for the future of the enterprise is defined, consistently with the mission.

Unlike the mission, the conceptual vision is not continuous, but must be attained within a predetermined time frame. This conceptual vision provides the destination point. Given its conceptual nature, the corporate vision must now be broken down into specific goals or objectives, that are numbered for reference. Outputs are then associated with each objective, as measurable outcomes that will clearly indicate the achievement of the associated objective. To secure this association, outputs are numbered consistently with their corresponding objectives.

Now that a start point, a direction, and a destination point have been defined, the intermediate steps that lead to each outcome must be delineated. These constitute the factors that are critical to successful achievement of these outputs, and are consequently referred to as the Critical Success Factors (CSF). Each output is given a set of CSFs associated with it, with appropriate numbering for reference. At this point, a strategy is put into place for achieving all of the CSFs for each of the outputs. Each strategy is numbered consistently with the output at which it is meant to arrive. Finally, a set of specific short term action items is associated with each strategy, as a means to move from the current situation towards the first CSF for each output. As before, action items are numbered consistently with the CSFs they are meant to lead towards. The implementation strategy stage 42 provides a start point for the implementation planning stage 44. The implementation planning stage 44 includes an Applications and Process Portfolio Analysis (APPA) process 442, followed by a series of Applications Staging and Planning (ASAP) 444 sessions. The APPA process and the ASAP sessions can be performed manually or with the aid of expert systems.

The intent of the APPA process 442 is to gather and document an inventory of all the current and envisioned applications and business processes of an enterprise. The APPA process 442 separates the strategic from the tactical, and for each one, determines the transition that needs to take place to move from the existing to the envisioned situation.

The range of transition possibilities include: do nothing, re-architect, re-engineer, re-architect and then re-engineer, replace by an off-the-shelf commercial solution, replace by a custom solution built in-house, and integrate. The do nothing option retains the existing application or process as is. The re-architect option translates the existing application to the new architecture without changing any of the existing functionality. The re-engineer option changes the existing functionality while remaining on the same architecture. The option of combining re-architecting and re-engineering first translates the existing application into the new architecture, and then modifies the application functionality in the context of the new architecture. The option of replacing by an off-the-shelf commercial solution replaces the existing application with a corresponding application package which is used, with or without customization, to perform the function of the replaced application. This solution is not an alternative for strategic applications and processes due to the inherent strategic nature of such solutions and to the loss of competitive advantage of the enterprise should these solution be built using tools and methods commercially available and thus easily reproducible. The option of replacing by a custom solution built in-house replaces the existing application with a new application built from scratch, using the new architecture. The integration option combines the various applications (whether already present, re-architected, re-engineered, purchased, or custom developed) into the new architecture to obtain a coherent infrastructure based on the new architecture.

Once this inventory is completed, applications and processes are prioritized, and the planning of the transition can be initiated, starting with the applications and processes with the highest priority. This transition planning corresponds to the ASAP process 444, which focuses on a single application or process. The ASAP process 444 focuses on the details of the existing and envisioned application or process, evaluates the scope of the transition effort, and prepares a detailed implementation plan to conduct the transition, including tasks, schedule, and resources. An ASAP process 444 is thus carried out for each application and process identified during the APPA process 442, in order of decreasing priority.

Once the implementation planning stage 44 is completed as described above, the actual implementation stage 46 can be initiated. Depending on the transition alternative selected for a particular application or process, a different implementation process may be applied. At the implementation stage 46, multiple applications and processes can go through the transition in parallel.

A Strategic Application Advancement (SAA) process 461 is an automated implementation process that focuses on re-architecting. Re-architecting preserves an application's core functionality intact, transformed into a multi-tiered client/server architecture. Re-architecting is often followed by re-engineering to add or change existing functionality to accommodate new business processes. Re-architecting involves identifying the business goals, objectives, and processes encompassed by the system, determining the existing source and desired target architectures, defining information systems standards, determining infrastructure requirements, performing the actual conversion, providing any re-engineering required, including design documentation for re-engineering requirements and technical documentation for re-architected application maintenance, and empowerment of staff for application maintenance and enhancements.

A Strategic Applications System Development (SASD) process 463 is a manual implementation process that focuses on re-engineering or custom development. The SASD process 463 encompasses the design and development of re-engineered or custom-built multi-tiered client/server applications conforming to open system industry standards. Re-engineering refers to modifications to an existing system, usually the product of a prior re-architecting effort. Re-engineering must take into account the maintainability and performance issues that arise when attempting substantial changes to an application designed for a legacy system and converted to a multi-tiered client/server architecture. Custom development refers to the creation of a multi-tiered client/server application from user requirements. Consequently, custom development follows familiar application life-cycle steps.

A Tactical Applications Planning and Implementation (TAPI) process 467 is a manual implementation process that focuses on the usage of commercial off-the-shelf packages. This involves selection and customization of commercial packages to achieve reusable applications in very short time frames. The TAPI process 467 is targeted to tactical as opposed to strategic applications, because such applications are not critical to the competitive posture of the business and therefore can make use of available packaged technology without endangering the competitiveness of an enterprise.

An Open Systems Integration (OSI) process 469 is a manual implementation process that focuses on integrating applications that are purchased, newly custom developed, re-architected, or re-engineered to share data and screens. This process includes the definition of business goals and objectives, the definition of applicable business processes, the study of application interactions and data relationships, and the planning of hardware and software infrastructures. The OSI process 469 also includes the implementation of the integration, including detailed implementation plan and schedule and detailed requirements and design documentation, user acceptance testing, comprehensive technical documentation, and empowerment of support staff for the maintenance phase. One powerful example of integration at the user interface layer using the OSI process 469 is the creation of a corporate intranet using internet HyperText Manipulation Language (HTML) or a highly-level language generating HTML, such as Java from Sun Microsystems to provide a user-friendly, platform independent, common user interface to corporate application.

Implementation also includes a Skills Enhancement and Empowerment (SEE) process 462 and an Operations Process Advancement (OPA) process 468. The SEE process 462 focuses on organizational issues during implementation, such as changing management and personnel training. The OPA process 468 focuses on operational support of the applications developed by the other implementation processes, including standardization of tools and processes, infrastructure setup, and system operation.

Once the implementation stage 46 is completed, the operations stage 48 begins. The operations stage 48 includes a Customer Service and Support (CSS) process 480, which can include initial or continued application maintenance and user support, full-size production and operations, and possibly outsourcing of all information system needs. As mentioned previously, the facilitation tools of the re-engineering system are available for electronic planning, tracking, and documentation of all the stages of the transition management process 40.

Figure 4:
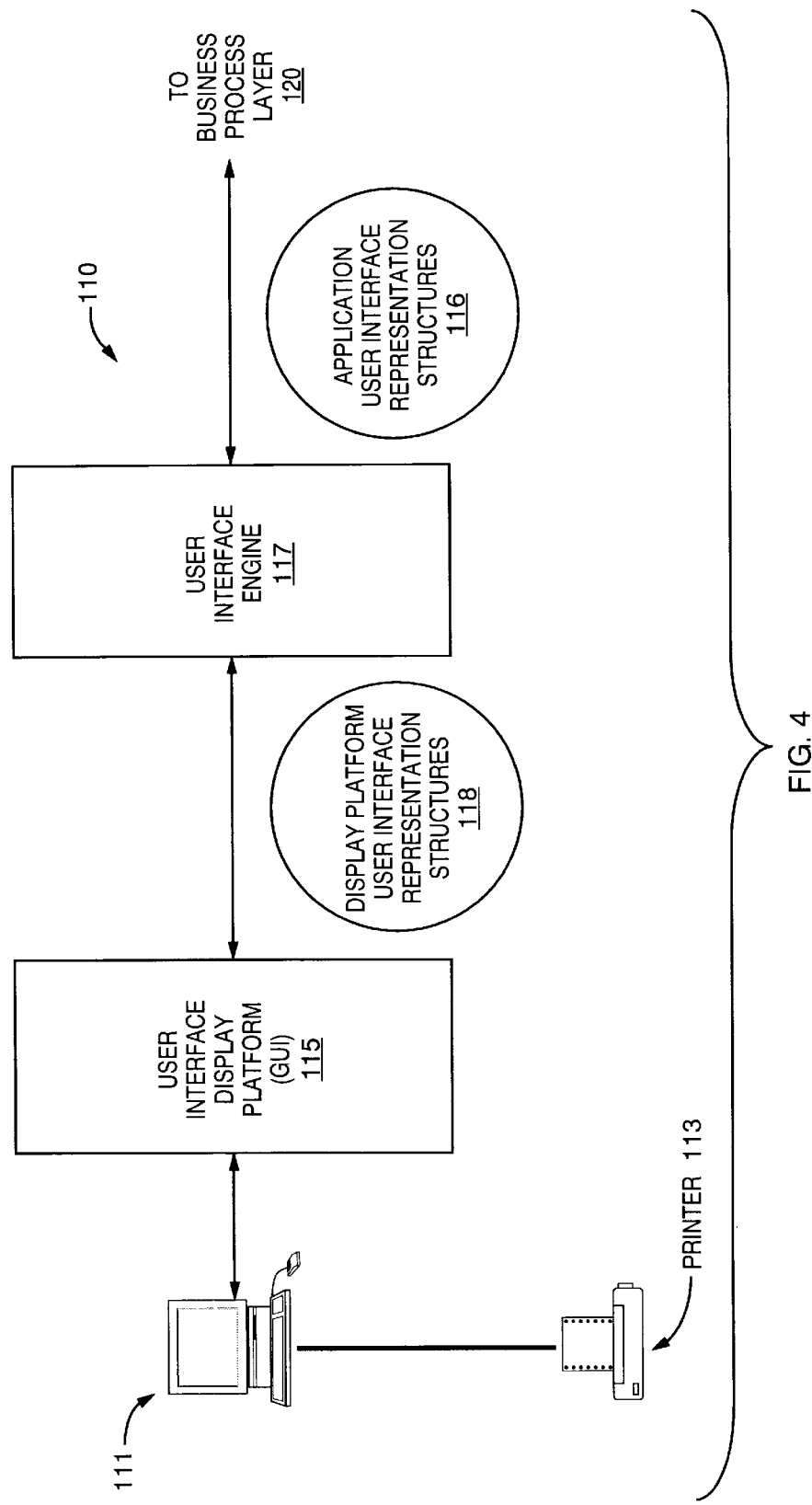
FIG. 4 is a schematic diagram of the presentation layer 110 of FIG. 1.

FIG. 4 is a schematic diagram of the presentation layer 110 of FIG. 1. In its simplest form, the presentation layer 110 can be implemented using a conventional personal computer. It can also take the form of an X-terminal, a workstation console, or a Macintosh style interface display. As shown, the presentation layer 110 includes a processor 111 having the current screen representation, constructed according to the principles of the present invention. The processor is preferably a user workstation which includes a display unit through which commands or user selections can be entered via a keyboard or mouse. The processor 111 also includes internal or external storage, such as a disk device, from which a user interface engine is loaded into the memory of the processor 111 as required. For a personal computer, X-terminal, or workstation having a large main memory storage, the entire application front-end can remain resident, thereby enhancing system performance. The storage unit is also used to store presentation layer log files. The presentation layer 110 can further include a printer 113, connected to the processor 111 through a communication link, such as a parallel or serial port. The printer 113 can be used to provide a permanent record of application log files, reports, source code, or screen listings according to the present invention.

As shown in FIG. 4, the presentation layer 110 includes a user interface display platform 115, an application user interface representation mechanism 116, and a user interface engine 117. In a preferred embodiment of the present invention, the user interface display platform 115 is a conventional Graphical User Interface (GUI) tool, commercially available. Consequently, the user interface display platform 115 has its own internal user interface representation mechanism 118 to display the various components of a user interface, usually in a graphical way.

Preferably, the underlying internal user interface of the user interface display platforms 115 is preferably derived from a frame-based system. A frame system is a network of frames and relations, corresponding to the nodes and links of a mathematical graph. Frame systems are organized in a hierarchy in which the high-level frames represent more general concepts and the lower frames represent more specific concepts. At the lowest levels, the frames represent instances of those concepts. The concept at each frame is defined by a collection of attributes or properties which can have values and, in this respect, the frames and attributes in a frame system are comparable to the records and fields in a database system. Each attribute can have a descriptor associated with it to define the constraints on the values the attribute accepts. Each attribute can also have procedures or programs called daemons attached to it which are executed when the value of the attribute is modified. In such a system, a frame can inherit the attributes or properties of higher level frames.

A preferred embodiment of the present invention uses a frame-type representation in an object-oriented organization in which the frames represent objects. More specifically, the frames representing general concepts are referred to as classes and those representing specific occurrences of a concept are referred to as instances. In this context, attributes are termed members, and member inheritance and procedural attachment take place as in a frame system.

In object-oriented systems, however, objects communicate with one another by sending and receiving messages. When an object receives a message, it consults its predefined answers for messages to decide on what action to take. These answers can be stored directly with the object or inherited from a higher level object somewhere in the network hierarchy. Usually, the action involves triggering some rules, executing procedural code, or sending new messages to other objects in the system.

Similarly to the display platform user interface representation structures 118, the application user interface representation structures 116 store descriptive information representative of the different objects that compose a user interface. Each object is described by a structure comprising a plurality of fields containing information representing an attribute of that object or a relationship between the object and another object. The user interface engine 117 maps each of the different objects that compose the user interface of a given application into the corresponding representations 118 in the user interface display platform 115 of choice for that application.

On the one hand, the user interface engine 117 requests application user interface representation structures 116 from the business process layer 120. Once the business process layer 120 satisfies the request, the user interface engine 117 converts the application user interface representation structures 116 just received into user interface representation structures 118 that are expected by the user interface display platform 115 for display to the end user on a display station 111.

On the other hand, when the end user performs an action through the display station 111, such as selecting an item or modifying information, the user interface engine 117 translates that user request from user interface display platform representation structures 118 into the corresponding application user interface representation structures 116, which are then handed to the business process layer 120 for execution of the end user request.

Figure 5:
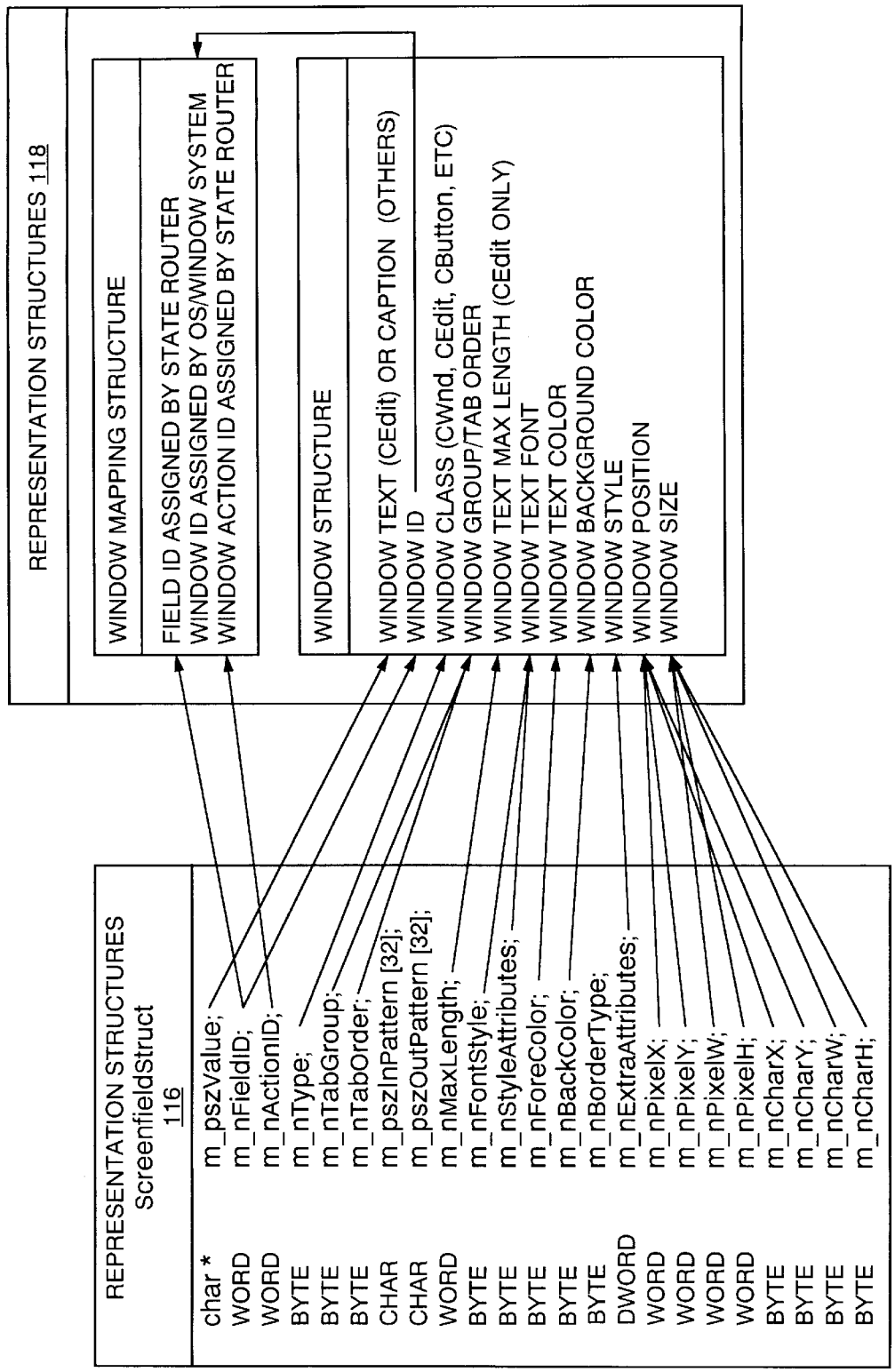
FIG. 5 is a schematic diagram of a sample mapping between application user interface representation structures 116 and display platform user interface representation structures 118.

FIG. 5 is a schematic diagram of a sample mapping between application user interface representation structures 116 and display platform user interface representation structures 118. In the figure, the user interface display platform 115 is exemplified as Microsoft Windows 3.x and the display platform user interface representation structures 117 are thus the internal Windows 3.x management structures. However, other user interface display platforms 115 using similar internal structures to manage windows are supported by the exact same user interface engine 117. Notably, the internet's world-wide web, based on the HTML or Java user interface languages, is another example of user interface display platform 115. Indeed, in a preferred embodiment of the present invention, the user interface engine 117 is written using Microsoft Visual C++ and based on the industry-standard Microsoft Foundations Classes (MFC) class library, which allows cross-platform development for Windows 3.x, Windows 95, Windows NT, MacOS, and UNIX-based user interface display platforms 115, including internet web servers.

Figure 6:
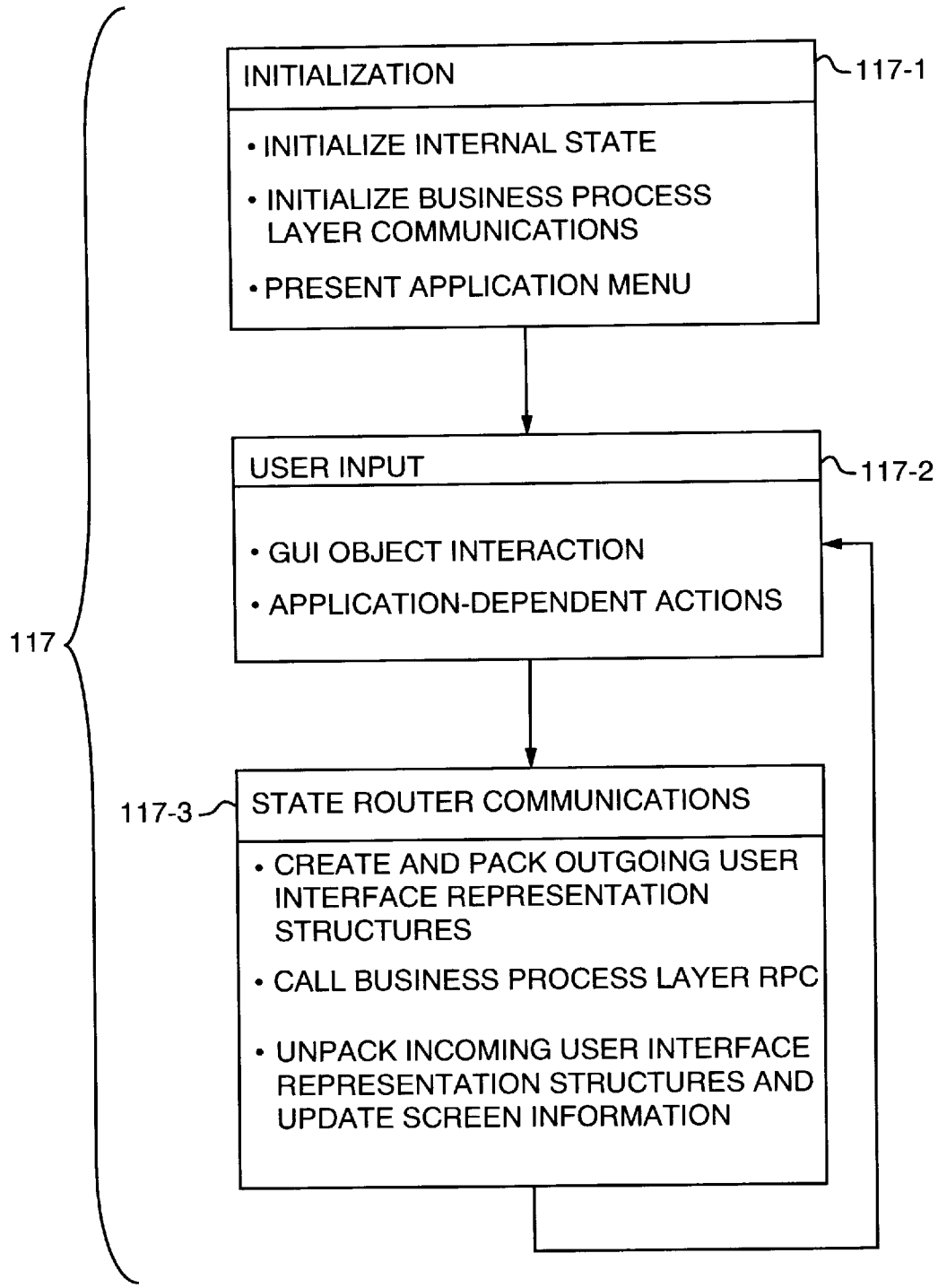
FIG. 6 is a block diagram of the operational modules of the user interface engine 117 of FIG. 4.

FIG. 6 is a block diagram of the operational modules of the user interface engine 117 of FIG. 4. The user interface engine 117 includes an initialization module 117-1, a user input module 117-2, and a state router communications module 117-3.

During initialization, the user interface engine 117 first initializes its initial state, setting up any structures necessary for operation. Depending on the implementation, the user interface engine 117 can then initialize communications with the business process layer 120, receiving a client identification number. Depending on the implementation, the user interface engine 117 can also display an initial application menu or screen, initial objects that are provided by the business process layer 120.

After completing the initialization, the user interface engine 117 continues to the user input module 117-2. The user interface engine 117 waits for user input and processes it accordingly. In particular, the user input module 117-2 handles interactions with GUI objects and performs application-dependent actions in response to user inputs.

If the user performs an action that depends on remote processing, however, processing continues to the state router communications module 117-3. In the state router communications module 117-3, the user interface engine 117 creates outgoing application user interface representation structures 116 from the screen data and packs these structures for delivery to the business process layer 120. Typically, the outgoing application user interface representation structures 116 contain values of screen fields which have changed since the previous call to the business process layer 120. The packed application user interface representation structures 116 are then sent to the business process layer 120, which returns packed application user interface representation structure 116 describing the result of the transaction. The packed application user interface representation structures 116 returned from the business process layer 120 are then unpacked and processed. Error messages can then be displayed, the screen can be updated with the results of the transaction, or a new screen can be shown. As long as the business process layer 120 does not indicate a fatal error, the user interface engine 117 processing continues (resumes the wait for user input) at the user input module 117-2 until the user exits the application.

Most of the user interface engine 117 processing occurs in the handling of screens: building a screen from a description, processing application-updated values from the business process layer 120, and sending user-updated values to the business process layer 120. If a new screen is sent from the business process layer 120, the current screen is discarded and replaced by the new screen. Communication with the business process layer 120, and more specifically its main state router component (described below), is always initiated by the user interface engine 117 because a remote procedure call (RPC) mechanism which interfaces the user interface engine 117 with the business process layer 120 is preferably unidirectional and synchronous.

To simulate asynchronous communication using a unidirectional synchronous RPC model, the user interface engine 117 includes an ability to periodically poll the state router for messages during the user interface engine's 117 idle time, namely when there is no user input to be processed. This functionality is known as idle message polling.

Essentially, during idle message polling the user interface engine 117 queries the state router for any initial messages. At the start of an interactive application, a first screen needs to be displayed to the user. This screen is usually a sign-on, or logon, screen which contains fields for the user identifier and user password, with possibly peripheral buttons to change the user password and access help screens. In addition, other graphics, such as an application logo or wallpaper, might be decorating the screen. After these initial messages have been processed, resulting in the display of the logon screen, application menu, and other object for the user to act upon, the user interface engine 117 waits to process user inputs. If the user takes no action and idle message polling is enabled, the user interface engine 117 will periodically query the state router for any messages. If message polling is disabled, the user input loop will continue indefinitely. Using a window mapping structure, which is preferably a two-way associative array, it is possible for the user interface engine 117 to allow window control handlers of the user interface display platform 111 to manage general window operation and make callbacks to the user interface engine handlers when an action is required, for example, when a button is pressed.

In a preferred embodiment of the present invention, the user interface engine 117 can process any type of action from any type of screen object, e.g. a button being pressed, a control gaining the input focus, or the Tab key being pressed. Typically, when an action is performed, one of two things may happen: the user interface engine 117 performs some internal function based on the action, or sends information to be processed back to the business process layer 120. In a particular preferred embodiment of the invention, all actions are referred back to the business process layer 120 for processing, along with any updated field values.

Figure 7:
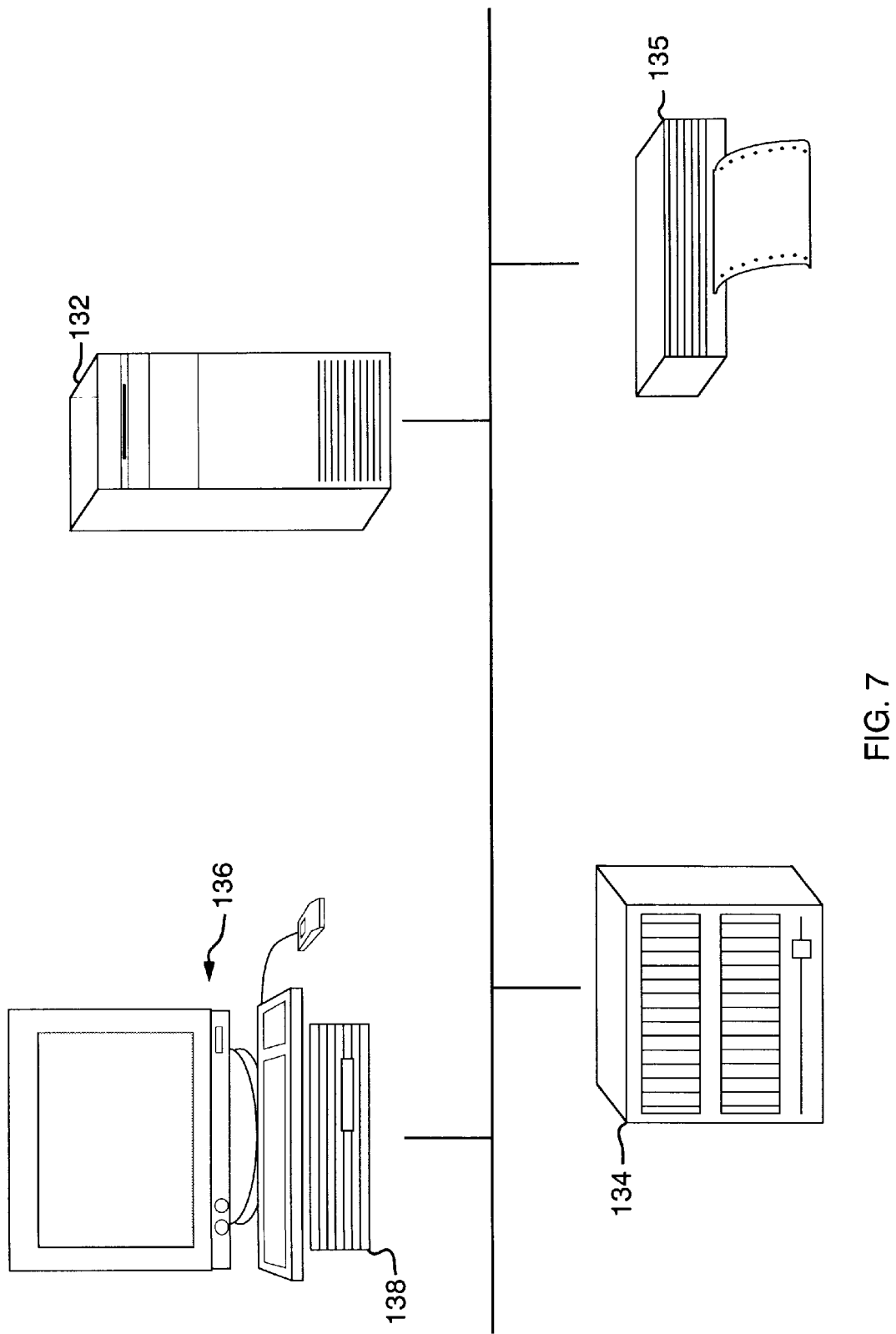
FIG. 7 is a schematic diagram illustrating the business process layer 120, functionality layer 130, and data access layer 140 of FIG. 1.

FIG. 7 is a schematic diagram illustrating the business process layer 120, functionality layer 130, and data access layer 140 of FIG. 1. In a preferred embodiment of the invention, these layers can be hosted on similar platforms. In a preferred embodiment of the present invention, these platforms include a host processor 132, in which the various engines are resident, internal or external storage 134, on which the logic or data access server runtime environment resides, and a terminal console 136 which serves as a human interface for host administration purposes. In addition, a communications controller 138 such as a LAN controller, modem or similar device serves as an interface to a communication link. The host computer system 132 can be considered conventional in design and may, for example, take the form of a E55 workstation, manufactured by Hewlett Packard Corporation. As shown, the business process layer 120, functionality layer 130, and data access layer 140 further include a printer 135 which can be used to provide a permanent record of application log files, reports, source code, or process objects and flows according to the present invention.

Figure 8:
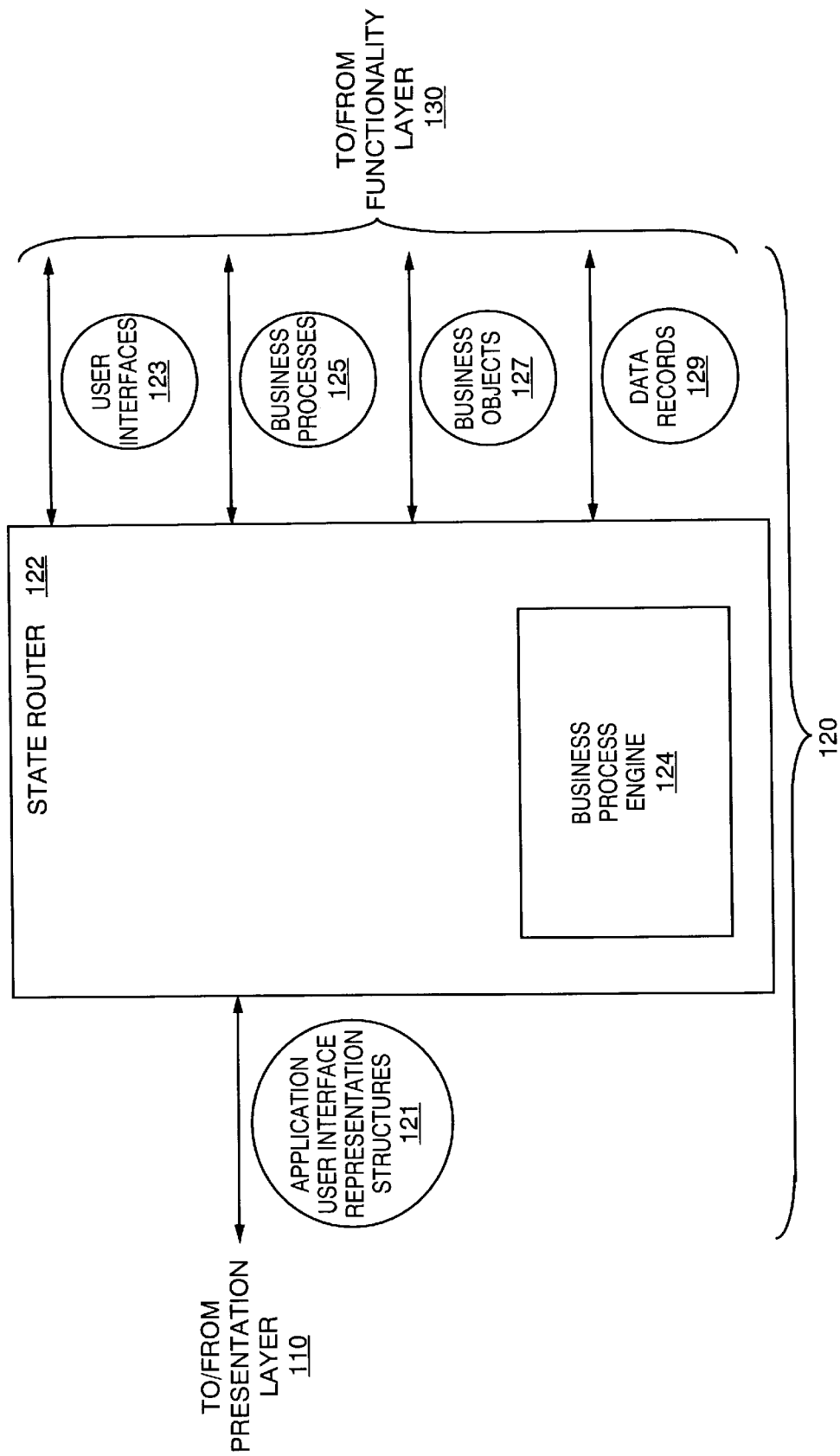
FIG. 8 is a block diagram of the business process layer 120 of FIG. 1.

FIG. 8 is a block diagram of the business process layer 120 of FIG. 1. The main component of the business process layer 120 is a state router 122. Conceptually, the state router 122 receives requests from the user interface engine 117 (FIG. 4) and, based on the request, determines which actions to take. The state router 122 then calls upon the functionality layer 130 to perform the selected action, passing any required information. Upon completion of the action by the functionality layer 130, the state router 122 accepts any resulting return information and forwards it to the user interface engine 117.

The requests received from the user interface engine 117 include application user interface representation structures 121. The application user interface representation structures 121 include request identifiers, transaction codes, screen information, and input/output buffers. A request identifier is the name of a function that needs to be executed in response to the request. There is one request identifier for any user interface event caused by the user. In this regard, request functions are similar to the conventional callbacks found in GUI languages such as X-Windows developed at the Massachusetts Institute of Technology, in Cambridge, Mass. Transaction codes are used to determine where to redirect the request. In this view, the state router 122 is simply a switch that differentiates between request identifiers and takes appropriate action in the form of a call to a function of the functionality layer 130. Screen information is used to keep track of the current state of the application. Input buffers are used to carry information from the presentation layer 110 to the business process layer 120 and output buffers are used to carry information from the business process layer 120 to the presentation layer 110.

Figure 9:
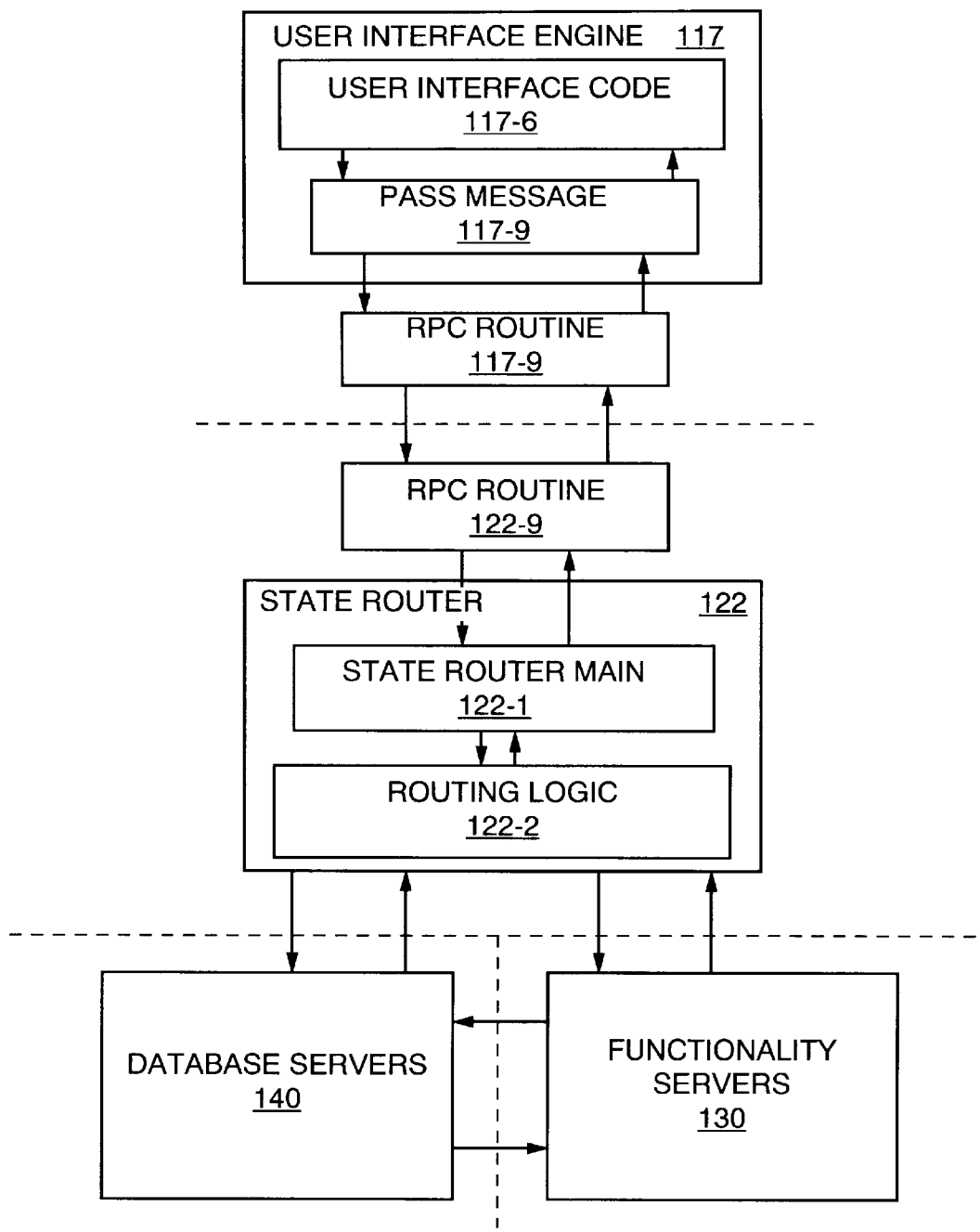
FIG. 9 is a flow diagram of the communication mechanism between the user interface engine 117 and the state router 122.

FIG. 9 is a flow diagram of the communication mechanism between the user interface engine 117 and the state router 122. As depicted, the user interface engine 117 includes a user interface routine 117-6 and initiates the communication by calling a pass message function 117-8. The pass message function 117-8 first compresses the application user interface representation structures 116 to be transmitted into a single request string using a packing procedure. The request string compression performed by the packing procedure is necessary because the outgoing application user interface representation structures 116 cannot be transferred efficiently as such across the communication link.

The pass message routine 117-8 then calls a remote procedure call (RPC) routine 117-9 for actual transmission of the request string over the network. The RPC routine 117-9 takes two parameters: the request string to be passed from the user interface engine 117 to the state router 122 and the return string to be returned to the user interface engine 117 from the state router 122. From the point of view of the state router 122, requests arrive in the form of strings of characters that need to be decomposed into the logical components of the request. Consequently, the first step taken by the state router 122 is to decompress the request string into its logical components using an unpacking procedure.

The unpacking procedure converts the request string into an array of request application user interface representation structures 121. This array is then passed to a main state router 122-1 function, which accounts for the core processing of the state router 122. Routing logic 122-2 then directs the objects to servers in the functionality layer 130 or the database layer 140. Once the state router 122 completes its processing, the resulting array of return application user interface representation structures 121 is again packed into a return string, which is passed back to the user interface engine 117 using an RPC mechanism 122-9.

Because new application user interface representation structures 121 can be added to facilitate the transport of new types of objects as required by a particular application, the packing and unpacking functions include a library having primitives which pack and unpack bytes (8-bit integers), words (16bit integers), double words (32-bit integers), and strings (both variable- and fixed-length). To create a new application user interface representation structure 121, a developer need only create packing and unpacking routines for that structure, assembling these functions from the primitive routines.

In the preferred embodiment of the present invention, the packing and unpacking library is written in such a way that the same source code compiles using structures (under ANSI C) or using object classes (under ANSI C++). Although the ANSI C language interface is very usable, the ANSI C++ language interface makes use of object-oriented features such as virtual functions to make packing and unpacking as transparent as possible. High-level packing and unpacking routines take arrays (or, in ANSI C++, containers) of application user interface representation structures 121 and create a single character string containing the packed information suitable for RPC transmission. This string contains type information as well as member data, so that any sequence of application user interface representation structures 121 can be sent and properly reconstructed at the receiving end.

In a preferred embodiment of the present invention, the state router 122 can be used to access the functionality layer 130 having custom-developed functionality servers as well as functionality servers converted from the IMS/VS model. The IMS/VS model is centered around the message concept, where the term "message" is used to refer to the model's communication structures with the functionality layer 130. In a basic IMS/VS model, the state router 122 performs four main conceptual functions: log-on processing, IMS communication modeling, message conversion, and log-off processing. Log-on processing consists of checking the user authorization and issuing a client identifier. IMS communication modeling is decomposed into transaction routing, conversation management, and message formatting service. Transaction routing uses Input-Output Program Control Block (IO-PCB) and Alternate Program Control Block (ALT-PCB) IMS structures to route calls and messages between programs. Conversation management uses an IMS Scratch Pad Area (SPA) to store the processing context. Message formatting services uses Message Input Descriptor (MID) and Message Output Descriptor (MOD) IMS control blocks to format messages and screens. Message conversion performs message packing and unpacking. Log-off processing performs clean-up functions with commit point processing.

Figure 10:
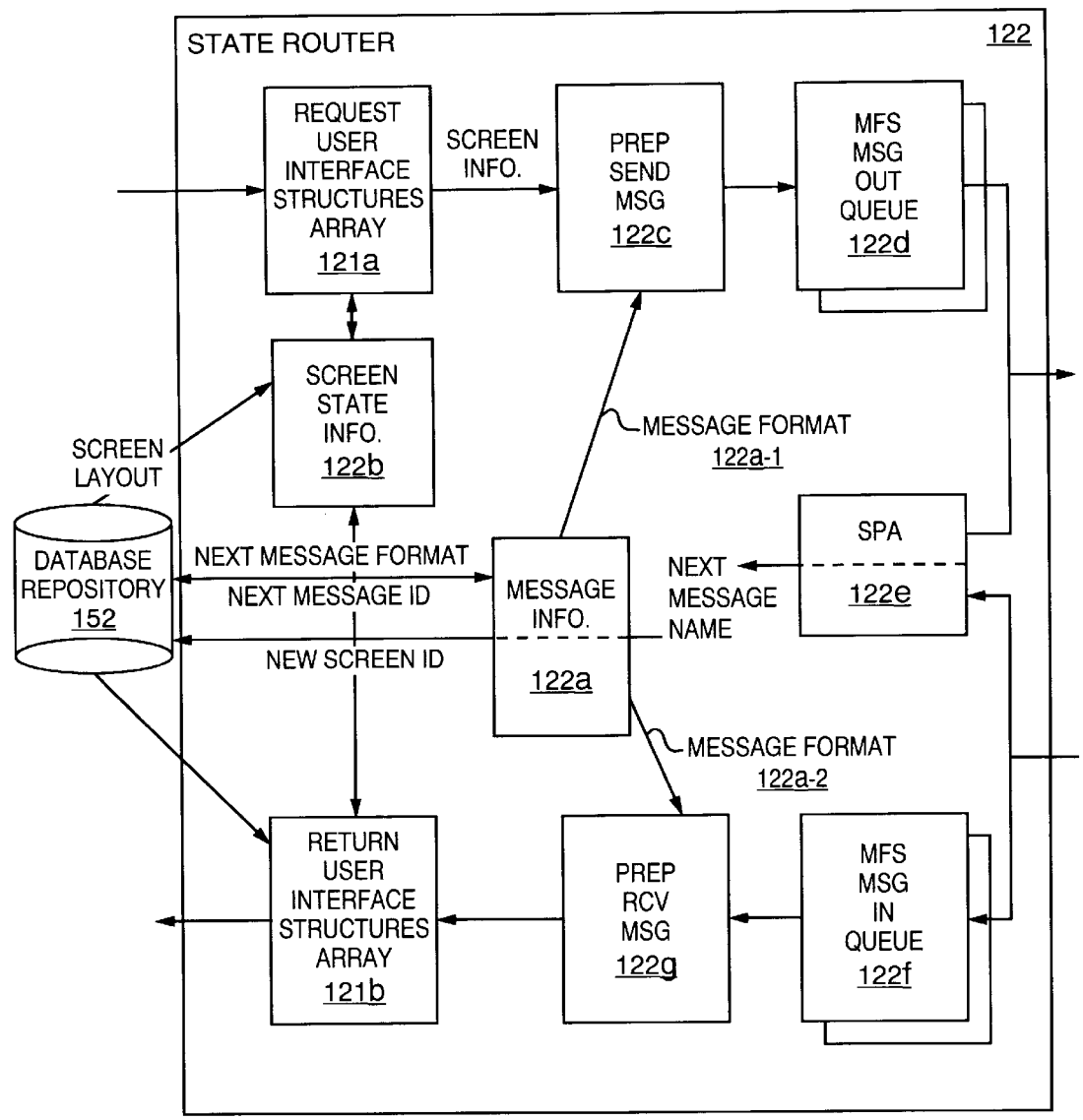
FIG. 10 is a flow diagram of the operations of a particular preferred state router 122 of FIG. 8.

FIG. 10 is a flow diagram of the operations of a particular preferred state router 122 of FIG. 8. Initially, when a logon request is received from the user interface engine 117 through the request user interface structure 121a and then authorized, the state router's 122 internal state is initialized with the current transaction code and the identifier of the first message. This message identifier is used to retrieve the full message format from a database repository 152. This process will be discussed in further detail below.

The full message is placed in a message structure 122a. Among other pieces of information, a message format 122a-1, 122a-2 provides the identifier of the related screen as well as the identifier of the next message. The screen information associated with this screen identifier is then loaded from the database repository 152. This screen information is passed back to the user interface engine 117 through the return application user interface representation structures 121. The user interface engine 117 then displays the screen and awaits user input. When a users enters or changes data on a screen and presses a function key, the user interface engine 117 translates this user input into a request to the state router 122.

Based on the contents of the request, the state router 122 saves its internal state into an old-state structure, and the current state is then updated with any new field values from the user interface engine 117. State information is represented by a field state structure 122b. Then, the state router 122 determines which functionality server to call.

As mentioned previously, the request identifier, which describes a function to be executed, is included with the request from the user interface engine 117. The state router 122 verifies the user's authorization to perform this function, and if authentication is successful, proceeds with its processing. If unsuccessful, an error condition is set, and the user is informed of an illegal access attempt. Assuming that authentication is successful, the determination of which functionality server to call is followed by a preparation of the message to be used for communication between the state router 122 and the selected functionality server, using a prepare to send message function 122c to build one or more messages to be put on the top of the outgoing Message Format Service (MFS) message queue 122d.

For an MFS-aware functionality server, the message is built as follows. Each field in the message, assuming field length n, is allocated n bytes in the message at a predefined offset. Additionally, a field may have two additional bytes allocated to it for passing the field's attribute in the message. A field's value is placed in the message if either of the following conditions holds: if the field's value has changed (which is determined by comparing the value of the field in the current state to the value of that field in the previous state), or if the field's attributes specify that its value should always be placed in the message regardless of whether it has been modified (this attribute is known as "pre-modified"). If the space in the message for a field value placed in the message exceeds the length of the field value itself, the allocated space is padded with the pad character specified for that field. Finally, if a field's value has not been modified, and the pre-modified attribute is not set for that field, its space in the message is filled with '@' characters. When all fields in the message have been considered, the message is complete. The message is then sent to the functionality server designated to handle the current transaction code.

The SPA 122e is provided as a functionality server-independent area of memory used for inter-functionality server communication. The SPA 122e is either newly-initialized, upon the first communication with the functionality server, or returned from the previous call to the functionality server.

When the call completes, a pointer is returned to the incoming MFS message queue 122f, where the functionality server placed one or more messages for transmission to the state router 122. The returned information includes an auxiliary buffer, a MOD structure, a SPA, and field value information similar to that of the message passed from the state router 122 to the functionality server. The auxiliary buffer specifies the name of the MOD structure. The MOD structure contains either a message identifier to describe the next message for updates to the current screen or a transaction name to initiate a switch to a new screen.

Upon receipt of this information, the state router 122 first determines whether the MOD structure contains a transaction or a message. If a transaction is present, indicating a screen switch, the new screen information is loaded from the database repository 152, and its information is included in the return application user interface representation structures 121b destined for the user interface engine 117. The state router 122 then recalls the functionality server that corresponds to the new transaction in what is called an "immediate switch". On the other hand, if the MOD structure contains a new message name, the state router 122 retrieves the new message format from the database repository 152 and passes it to a prepare to receive message function 122g, along with the incoming MFS message queue 122f. This function updates the structures and processes the return message in a manner similar to the processing of the request message. Notably, new values and attributes are entered into the state router's 122 internal state. The attributes returned with each field specify whether the field is to maintain its old value, revert to its original attributes, or clear its value. The new values and attributes are then included in the return application user interface representation structures 121 array passed back to the RPC mechanism for return to the user interface engine 117.

The above description of the state router 122 operations focused on the case of communication with functionality servers converted from the IMS/VS environment. In the case of custom functionality servers, the state router 122 still processes requests received from the user interface engine 117 in response to user interface event caused by the user in manner similar to that described earlier. However, much of the ensuing IMS/VS message processing can be bypassed in favor of a more generic mechanism embodied in the usage of a business process engine 124.

In this custom model, the state router 122 still redirects processing to appropriate functionality servers based on the transaction codes received from the user interface engine 117. However, when the functionality server returns, it passes back an event to the business process engine 124 component of the state router 122. The business process engine 124 is an event handler implemented as a conventional non-deterministic finite automaton (NFA).

By way of background, an NFA is a mathematical model that consists of a set of states, a set of input symbols, a transition function that maps state-symbol pairs to sets of states, an initial state, and a set of final states. A special case of NFA is the deterministic finite automaton (DFA), which can have no unlabelled edges and at most one edge with the same label leaving a given state. Where time-space tradeoffs are an issue, an NFA is slower than a DFA but consumes much less space. In any event, an NFA and a DFA are both appropriate representations for real-life business processes. Furthermore, an NFA can automatically be converted into a DFA using fundamental principles of state machines and finite automaton theory. Consequently, which representation is used is of little consequence to a preferred embodiment of the business process engine 124. In addition, because business processes can be composed of a series of unrelated processes or can even be decomposed into sub-processes, more than one NFA, possibly organized in a hierarchical fashion, can be used to represent the various business processes modeled by an application.

In any case, the business process engine 124 preferably implements an NFA as follows. Upon receiving an event from the state router 122, the business process engine 124 first checks the validity of the event. If the event is valid, the business process engine 124 then examines all transitions out of the current state, which could be the initial state if this is the first call to the business process engine 124. If the business process engine 124 does not find a transition that corresponds to the event received from the state router 122, it simply remains in its current state, releasing control back to the state router 122. On the other hand, should the business process engine 124 find a transition that includes the event received, the current state is saved and the next state is derived by starting at the current state and following the transition corresponding to the event received. The next state thus reached now becomes the current state.

Because states include initialization routines, the business process engine 124 executes any initialization routine associated with the next state immediately upon arrival at this next state. This initialization function can require another transition followed by another change of state, and therefore the business process engine 124 ends its processing by calling itself recursively, based on the event returned by the initialization function.

A complication can occur when a transition leads to a state that is not part of the business process modeled by the current NFA. In this instance, the business process engine 124 needs to switch to the NFA containing the next state. For this purpose, the business process engine 124 also maintains a current business process set. This enables the business process engine 124 to keep track of its position in the business process or NFA hierarchy.

Figure 11:
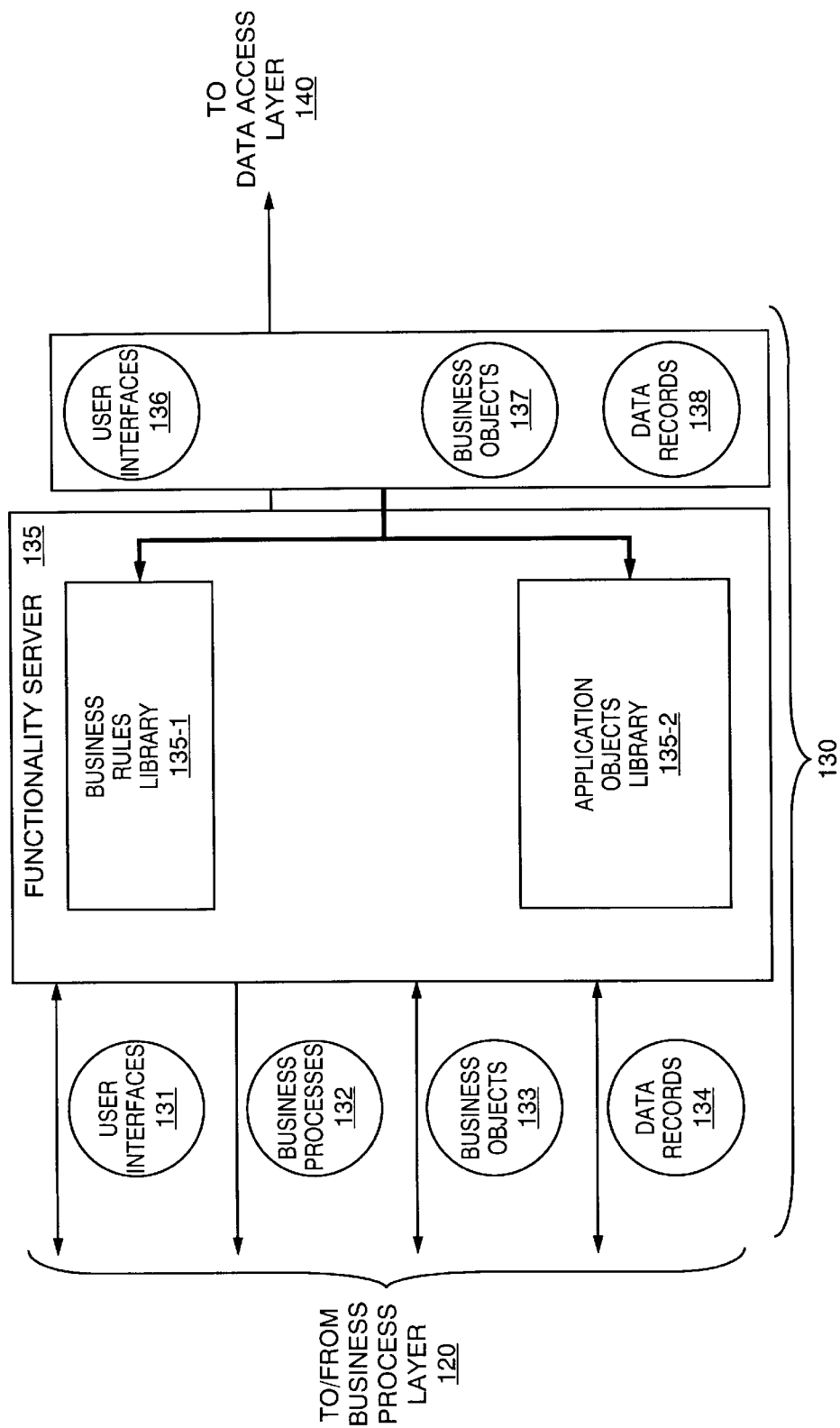
FIG. 11 is a block diagram of the functionality layer 130 of FIG. 1.

FIG. 11 is a block diagram of the functionality layer 130 of FIG. 1. Conceptually, the functionality layer 130 manages the business objects manipulated by the business process layer 120. These business objects constitute the fundamental components of an application. In a traditional manual system, a business object is associated with one or more physical paper forms. These forms contain the fields that hold the information relevant to the business object. Forms differ not only in their physical appearance, but also in the rules that govern their use. For example, a highly confidential form is treated differently from a non-confidential form. Other business rules may also govern the handling of forms. For example, some invoices might require more than one signature if their amount is bigger than a certain value. It is the form and the rules that govern its handling that define a business object in a traditional manual system.

The business objects represent the physical forms, the information in those forms, and the rules that govern these forms. As discussed previously in the context of a re-engineering or custom-developed application, the business process engine 124 of the business process layer 120 manages the flow of business objects, interprets their rules, and acts on these rules.

In a preferred embodiment of the present invention, the functionality layer 130 must also be able to handle IMS/VS COBOL functionality code. In IMS, functionality codes are structured into transactions composed of a main program called a driver and transaction programs for the various function keys the driver handles. Accordingly, a functionality server 135 performs a number of functions.

These functions comprise include file processing, server initialization, transaction call resolution, transaction entry point processing, and server wrap-up. Include file processing comprises initializing global variables, notably the Program Specification Block (PSB) structures for each transaction. By way of background, a PSB defines, for a given transaction, the database which may be accessed, the database segments that are available, and the type of access (read, update, etc.) which may occur. A PSB is also a collection of Program Communication Blocks (PCB). A PCB is an IMS structure to control the access to data as will be described in detail below.

Server initialization comprises unpacking the message received from the state router 122, to obtain the SPA and its call parameters, and assigning local function pointers. An additional level of indirection for each transaction program main routine is necessary for ANSI C to mimic the COBOL "goto" capability to span across routines and exit at any point in the program.

Transaction call resolution comprises determining the driver to call based on the transaction identifier specified in the RPC received from state router 122, associating the appropriate PSB structure obtained from the include file with the selected driver, and calling the driver with its arguments. Once in the driver code, control flows according to defined COBOL language principles. Two COBOL constructs merit further description in the context of ANSI C functionality code converted from COBOL, namely special routines called entry points and COBOL variables.

Transaction entry point processing comprises performing calls to transaction entry points in the converted COBOL functionality code. Transaction entry points include routines to perform calls to various local (sub) routines or external COBOL library routines, as well as routines to establish communication with the data access layer 140 (ENTRY statement) and perform calls to the database server/IO devices (CBLTDLI). A typical database access consists of an initial GET call to populate the I/O work area, followed by modifications to the I/O work area for subsequent insert (ISRT) or replace (REPL) calls. After each database access, the return status of the call is checked to take action based on the result of the database operation.

In a preferred embodiment of the invention, COBOL variables are implemented as COBOL structures. A COBOL structure contains a data field, which consists of a pointer to an area in memory used to store the value of the variable. Another field stores the length of this data memory area. The COBOL structures also contain a mask, which is a string describing the COBOL format specification for the variable. For example, a mask of "PIC X(3)" refers to a string of 3 characters. Sometimes COBOL variables exist in a hierarchy of other COBOL variables. Consequently, the COBOL structures also contain the number of sub-variables or sub COBOL structures in the current variable or COBOL structure hierarchy. A COBOL structure variable can thus be viewed as pointing to a buffer containing its data, all sub COBOL structure variables pointing to the proper offsets in that buffer.

The last function performed by the functionality layer 130 is server wrap-up. Server wrap-up includes preparing return data, notably packing the SPAM for return to the state router 122.

Figure 12:
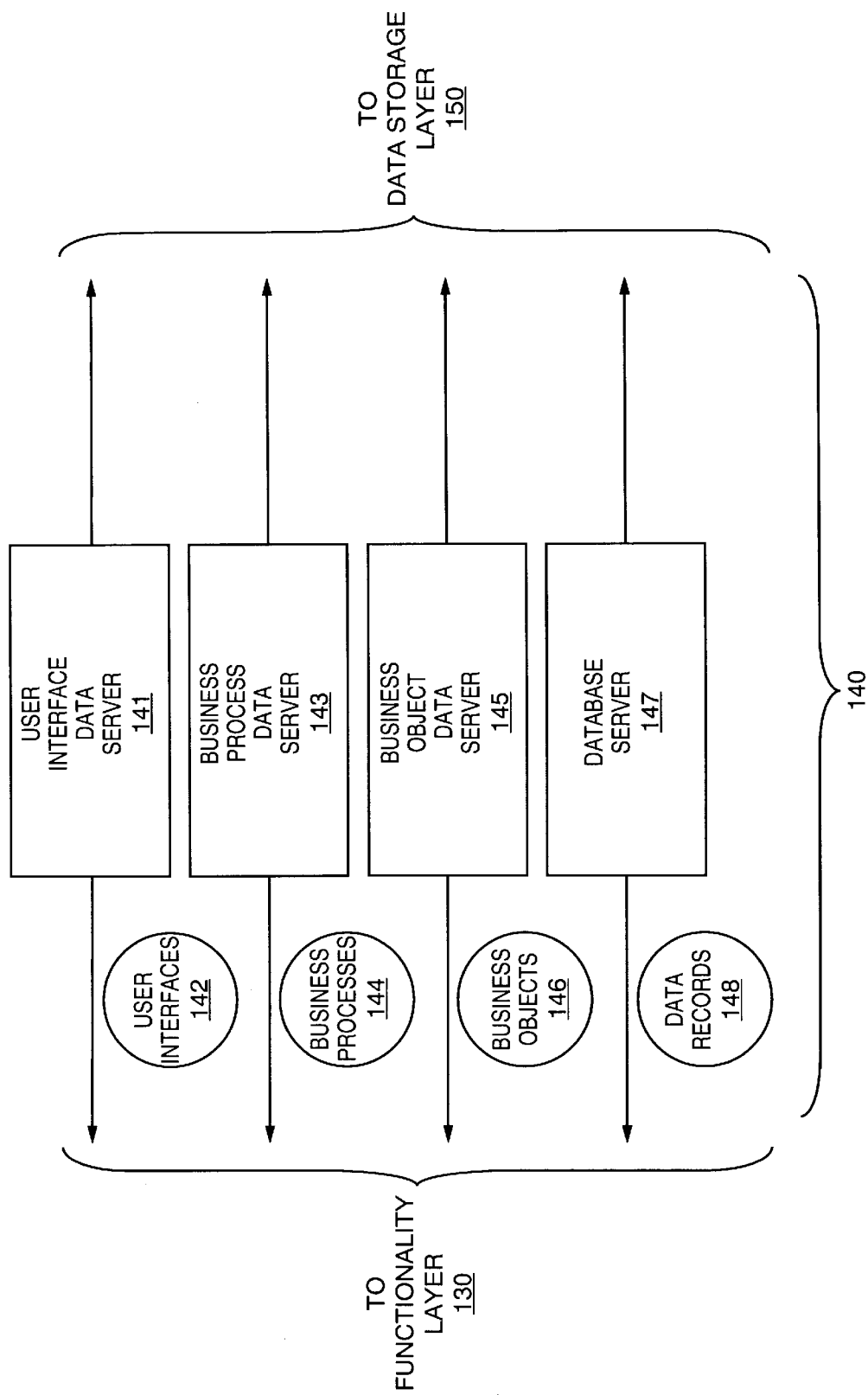
FIG. 12 is a block diagram of the data access layer 140 of FIG. 1.

FIG. 12 is a block diagram of the data access layer 140 of FIG. 1. The data access layer 140 comprises a number of data servers. As mentioned previously, the data servers are used to access and retrieve data from the data storage layer 150. Preferably, one data server exists for each of the four application object repositories. Consequently, there is user interface data server 141 to manipulate user interface objects 142, a business process data server 143 for business processes 144, a business object data server 145 for business objects 146, and a database server 147 for application data records 148. The data servers constitute the sole interface between the data storage layer 140 and the functionality layer 130, and each data server is only in charge of exchanging with the functionality layer 130 information about the type of application object it services.

According to client/server technology, a server is any program that runs a function invoked by a different program. A server is thus a software concept that provides a way to package together a set of related functions. Consequently, it could be implemented as a conventional third generation language sub-routine or library.

In the present invention, a number of the components referred to as libraries can be implemented as servers and vice versa. The server implementation, however, is better suited to inter-platform communication, and is a preferred embodiment for the communication links of the present invention.

By way of background, servers can be left to run continuously in stand-alone mode and accept requests from multiple clients. The set of functions, or services, provided by a server constitutes the server interface. This interface is specified in an Interface Definition Language (IDL) file. The concept of servers is well known, and details of server development and operations, including stub generation and IDL file syntax and specification are commercially available.

The data access layer 140 can now be viewed as a set of database access and retrieval functions. There is one function for each one of the data access construct of the source Data Base Management System (DBMS). Each such function must emulate the behavior of the corresponding source DBMS data accessor construct. In the preferred embodiment of the present invention, the target DBMS is typically based on a conventional relational model, and is called a Relational DBMS (RDBMS). The source DBMS can be built around a number of conventional data models. The most common such models are the flat file, hierarchical, network, CODASYL (Conference on Data Systems Languages), relational, and object-oriented data models.

By way of background, the flat file model is a generalized file management system that adds report generation and file management additions to third-generation programming languages such as COBOL. An example of such as model is the Report Program Generator (RPG) from International Business Machines, Incorporated. The hierarchical model is a hierarchical tree of nodes made of records and fields, with tree search capabilities. An example of such a model is IMS Data Language 1 (DL/1). The network model is an extension of the hierarchical model, where nodes may have more than one parent. The network model is also referred to as CODASYL, which is the initial embodiment of this model using owner and member records linked by pointers, as originated by Honeywell Information Systems, Incorporated. Examples of the network model are Integrated Data Store (IDS) from IBM, and Integrated Database Management System (IDMS) from Cullinet, Incorporated. Given the fundamental differences between these models, the data access library must be careful to map the semantics of the source database to the appropriate constructs in the target database.

In its simplest form, this mapping results in a simulation of the source DBMS in a relational model, which is not always ideal for readability and maintainability. A preferred embodiment of this invention extends this mapping to a true conversion of the source data model to the relational data model. The initial relational model thus obtained is further normalized to a specified degree controlled by parameter using a bacchus-normal form utility, leading to a true relational model. In the context of the present invention, such libraries exist for all the common source data models mentioned. Because an overwhelming majority of existing database systems fall into one of the source data models above, it is likely that most existing applications can be handled by one of these libraries with minor or no changes.

In a preferred embodiment of the present invention, the source DBMS is IMS DL/1. As discussed previously, IMS functionality code is structured into transactions composed of a main program called a driver and subprograms for the various function keys the driver handles. For every such IMS transaction in the functionality server, an entry function is called once to initialize the database server. This entry function calls a database server function through an intermediary to initialize the PCB structure in the database server. Then, every time the functionality server needs to access the database server, it calls the function CBLTDLI( ), which in turn calls a database server function to call the appropriate database function (e.g., GET, INSERT, DELETE, and REPLACE primarily). Communication between the functionality server and the database server is thus reduced to two functions: init and CBLTDLI (which, in IMS, stands for CoBoL To Data Language 1).

The main function of a database server is to fulfill requests for data from the functionality server 135. In the preferred embodiment of the present invention, this includes implementing the IMS DL/1 CBLTDLI call. This can be decomposed into three tasks: server initialization, CBLTDLI call resolution, and database access function execution. As discussed earlier, server initialization is performed on the PCBs for the current transaction. Then, the database server resolves CBLTDLI database calls.

The database server communicates with the database through ANSI SQL queries. The database server implements each type of IMS DL/1 function as follows. The database server first validates the arguments to the IMS DL/1 function. It then dynamically creates an ANSI SQL query string. In the preferred embodiment of the present invention, this query string is forwarded to the database using the Oracle Call Interface (OCI) from Oracle Corporation. At a high-level, the process consists in initializing bind and define variables, setting currency information, executing the SQL query, and returning query status.

Figure 13:
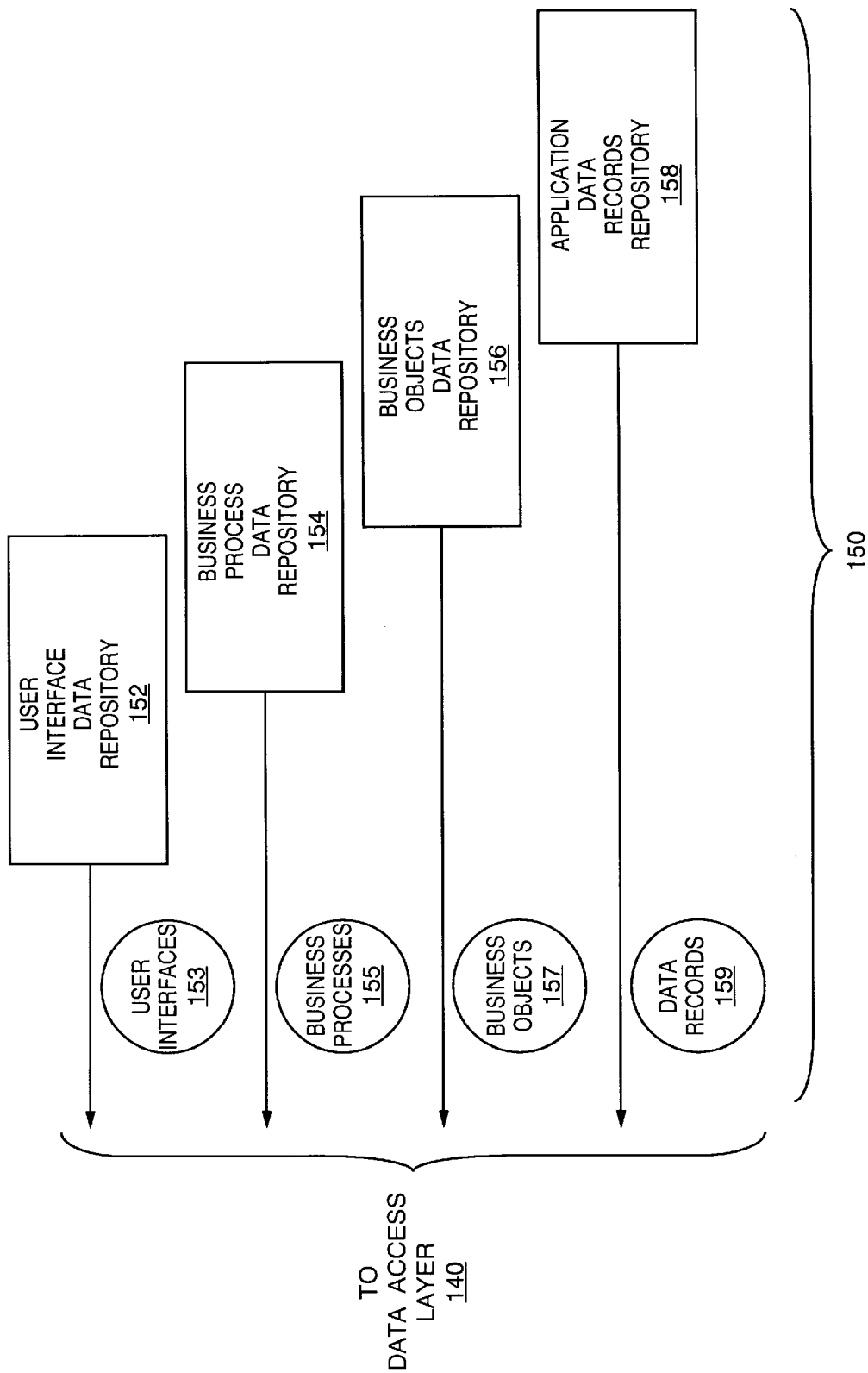
FIG. 13 is a block diagram of the data storage layer 150 of FIG. 1.

FIG. 13 is a block diagram of the data storage layer 150 of FIG. 1. The data storage layer 150 is a repository for data accessed by the data access layer 140. The user interface data repository 152 provides user interface objects 153 to the data access layer 140. The business process data repository 154 provides business processes 155 to the data access layer 140. The business object data repository 156 provides business objects 157 to the data access layer 140. The application data records repository 158 provides data records 159 to the data access layer 140.

Figure 14:
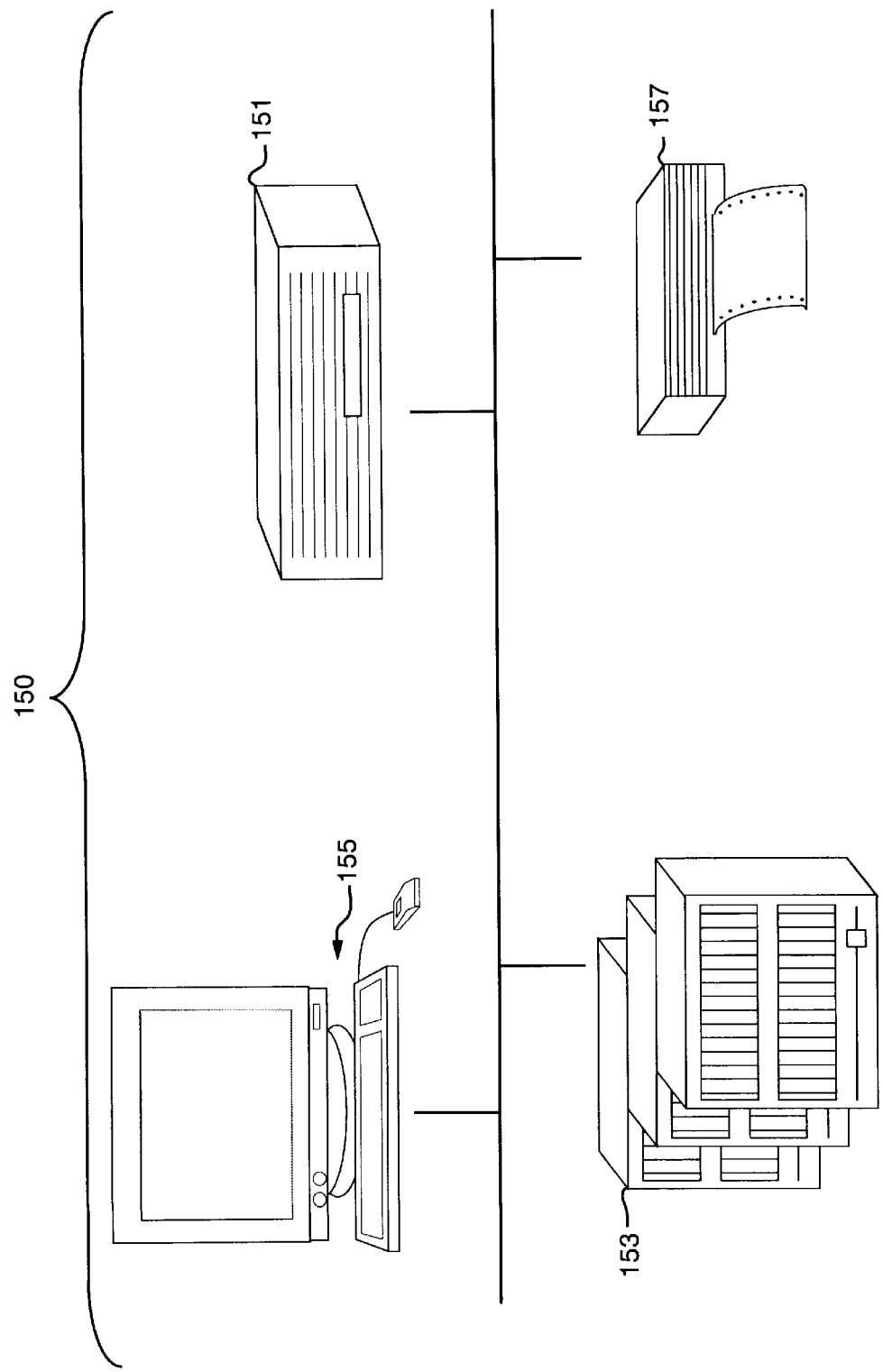
FIG. 14 is a schematic diagram of a hardware platform for the data storage layer 150 of FIG. 19.

FIG. 14 is a schematic diagram of a hardware platform for the data storage layer 150 of FIG. 1. As shown, the data storage layer 150 is hosted on a platform that includes a host processor 151, with one or more Central Processing Units (CPU), in which the Data Base Management System (DBMS) is resident, internal or external storage 153, usually an array of mirrored disks, on which all database data resides, and a terminal console 155 which serves as a human interface for host administration purposes. DBMS log files are stored in storage unit. A printer 157 is usually present for database diagnostics or large data outputs. In addition, a LAN controller, modem or similar device serves as a communication link 159. The DBMS and the host computer system 151 can be considered conventional in design and may, for example, take the form of an Oracle relational DBMS, manufactured by Oracle Corporation, and a T500 mini-computer, manufactured by Hewlett Packard Corporation respectively.

A preferred embodiment of the present invention uses the relational data model for the data storage layer. The relational data model can be viewed at three different levels: conceptual, logical, and physical. The conceptual level consists of entities, attributes, and relations. Entities are things that exist on their own, distinguishable from other objects. Entities (records, rows) are described in terms of their attributes (fields, columns). Relations are common fields between entities used to connect entities together. The Entity-Relationship data model (ER) is the predominant conceptual level description tool. It is used as a diagramming technique where rectangles represent entities, circles represent attributes, diamonds represent relationships. The logical level consists of records, fields, and relations.

The schema is the logical level description tool. In the relational model, a database schema consists of the description of the tables, their fields, and the fields formats and domains. The relational algebra provides the theoretical basis for the model, with five operators: selection, projection (deleting columns from table), product, union (adding the rows of two tables), difference and a composite: join.

Query languages based on relational algebra are Structured Query Language (SQL) and Query By Example (QBE), both originated by IBM. SQL is usually embedded within a third generation language such as C, called the host language. Because host languages do not typically have multi-record operations, special SQL commands such as the cursor concept are provided to process multi-row query results in a record-at-a-time fashion. A cursor is a name given to a query. When a cursor is opened, the corresponding query is executed. Any subsequent fetch command on the cursor returns a new row to the host language. When the cursor is closed, query results are no longer available to the host language. Other special commands in SQL embedded mode include transaction processing features, dynamic SQL generation, and authorization control. The physical level deals with data dictionaries, data definitions (physical file structures, file space allocation), storage devices (data compression), access methods (sequential, index-sequential, direct).

Sequential files use a sorted column to perform sequential search. Index-sequential adds an index to a given column to provide random access. Large indices may themselves be indexed. Sequential files are difficult to maintain because adding or deleting a record requires reorganization of the whole file. Indexed (inverted) files remove the sequential part. Fully inverted refers to indices associated with each column. Indices carry update overhead but enable fast access. Direct access uses a single key and a calculation from that key to locate the physical address of the data in memory.

The distribution discussed in the context of the present invention is reduced to process distribution. However, the data storage layer can also be distributed among different platforms. A decision on how the data can be distributed depends on the following four criteria: connectivity, volume, volatility, and usage. The inter-connectivity of the data is defined by the relations between entities. The volume or size of each entity is evaluated in terms of memory usage as well as number of records. The volatility is the rate of change in the volume of each entity. Finally, the usage is determined by the frequency of use of the various screens and the transaction rate.

Figure 15:
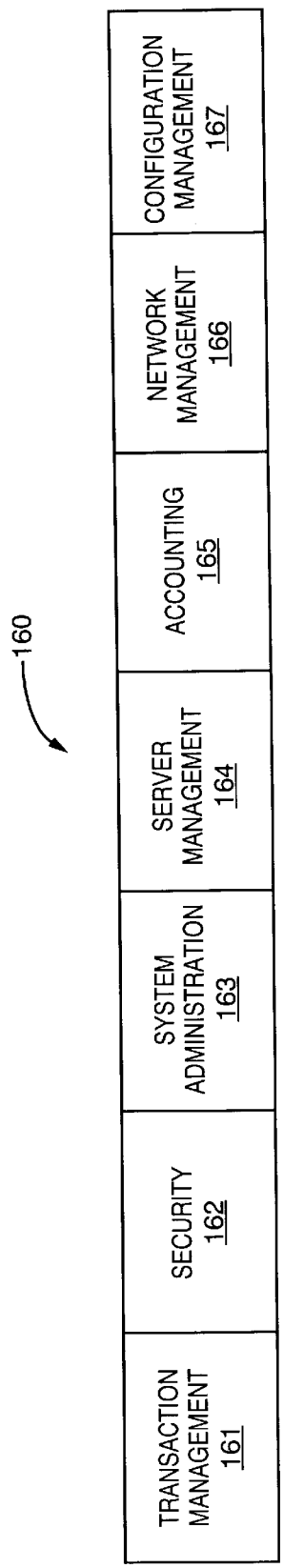
FIG. 15 is a block diagram of the control layer 160 of FIG. 1.

FIG. 15 is a block diagram of the control layer 160 of FIG. 1. The control layer 160 includes utilities for transaction management 161, security 162, system administration 163, server management 164, accounting 165, network management 166, and configuration management 167. These utilities can take the form of libraries or can consist of graphical user interfaces.

Transaction management 161 provides library utilities to manipulate transactions. Transactions are a way to package related application elements together. Transaction processing refers to the manipulation of groups of elements as opposed to the manipulation of the individual elements. A transaction that successfully completes the processing of all the elements that compose the transaction is finalized by a database commit, which saves the results of the processing of all its elements in a permanent form, usually in the database. Should the processing of one of the transaction elements fail, the transaction elements that have already been committed to the database need to be un-committed, and the whole transaction is rolled back, with appropriate error messages posted. Transaction management 161 is useful in distributed systems to insure data consistency in the absence of user-defined integrity constraints.

Security 162 is provided at all layers of an application through a library of functions to manage system as well as data security. At the presentation layer level 110, security functions are available at logon time and at the menu, screen, field, and button levels. At the functionality layer 130 level, access to entire servers or to a subset of the services provided by a server can be restricted. At the data layer 140 level, security functions manage access control lists (ACL), which enable application administrators to set up a hierarchy of user types for controlling access to application resources. In addition, the underlying database management system usually provides a wide range of security features which are implicitly available to the application.

System administration 163 provides graphic facilities for administrators to perform basic application administration tasks, such as lookup table maintenance, user access maintenance, and application backup and recovery.

Server management 164 provides mechanisms to organize servers in a hierarchical model in which entities called brokers keep track of the servers available to a given client and of their location. This can increase the robustness of applications through server redundancy.

Accounting libraries 165 are available to perform logging of application operations at all application tiers for performance monitoring, auditing, or error tracing and recovery. Logging is also available on a per client, server, or broker basis. Logging can come in various flavors, with control over the level of detail provided or the application resource or component being monitored.

Network management 166 provides a graphical interface to monitor clients, servers, and brokers. Network traffic and performance can thus be monitored, and network components restarted automatically or manually upon failure.

Configuration management 167 provides libraries for a number of diverse purposes. For instance, application version management functions are provided. In addition, currency is handled through locking functions to insure data consistency. Data integrity is controllable at the functionality layer by the business objects rules or constraints. The underlying database management system usually provides data integrity controls implicitly available to applications, but the usage of such controls are not recommended because it would mean encoding business logic in the data layer 150 instead of confining it to the functionality layer 130, and would therefore be contrary to the fundamental principle of the preferred multi-tiered architecture.

Communication links 170 are used by the other components to exchange information by the way of computer networks. By the way of background, computer networks consist of interconnected collections of autonomous computers. Networks are usually described in terms of the well known International Standards Organization (ISO) Open Systems Interconnection (OSI) reference model. ISO OSI describes networking in terms of seven layers, from lowest to highest: physical, data link, network, transport, session, presentation, and application.

Because distributed systems are a special case of a network that is transparent to the application, the present invention can rely on any one of the prevalent networking standards. For example, using ISO OSI terminology, one embodiment of the present invention can be based on the internet de facto standard. At the lowest physical and data link levels, a preferred embodiment of the present invention can be a standard communication media, such as a telephone network, local area network (LAN), wide area network (WAN) or direct line. The Internet Protocol (IP) can be used as the network protocol and the Transmission Control Protocol (TCP) as the transport protocol. Session and presentation layers do not exist in the internet model. Application protocols include FTP for file transfer, SMTP for electronic mail, and TELNET for remote login.

Because distributed applications are network transparent, the distinction lies in the software. Therefore, the preferred embodiment of the present invention uses commercial tools that hide all of the underlying network complexities and isolate applications from network implementations. These tools are based on the Remote Procedure Call (RPC) operating over TCP/IP or over the Distributed Computing Architecture (DCE) mechanism. Using an RPC, a client program performs what looks like a conventional function call. A piece of RPC generated code called a client stub handles all the aspects of handling the call, including packaging the function arguments for transport, called marshaling, and carrying out the transport.

On the server side, a similar RPC server stub unpacks the function arguments, called unmarshaling, and passes them to the server code that implements in a conventional way the function requested by the client. Upon completing the execution of the requested function, the server returns the results of the call to the client in a similar way. Because all transport complexities are addressed by the RPC generated stubs, RPCs acts just like conventional local calls.

For more complex distributed applications, a preferred embodiment of the present invention can use tools based on DCE, which is a more comprehensive distributed system infrastructure that includes directory services, distributed security, multi-threading, distributed file system, and central time management, in addition to RPCs. As sample implementation of RPCs effective over both TCP/IP and DCE networks, is the Entera toolkit from Open Environment Corporation.

Returning to FIG. 1, the re-architecting system 20 includes a user interface conversion utility 210, a procedural language conversion utility 220, and a data definition language conversion utility 230.

Figure 16:
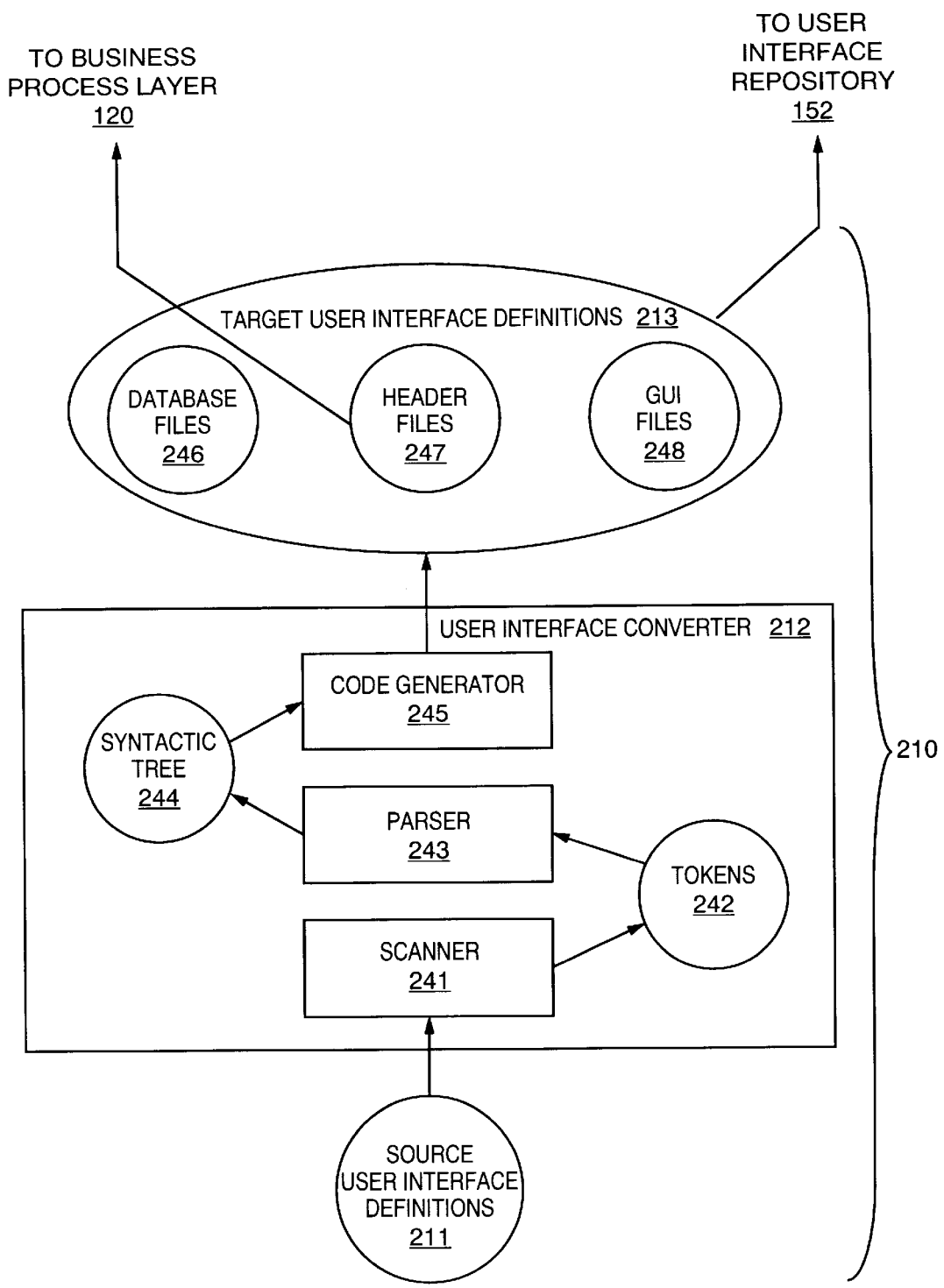
FIG. 16 is a block diagram of the user interface conversion utility 210 of FIG. 1.

FIG. 16 is a block diagram of the user interface conversion utility 210 of FIG. 1. The user interface conversion utility 210 converts the user interface of an existing application represented by the source user interface definitions 211 into target user interface definitions 213 using the user interface converter 212. In a preferred embodiment of the present invention, the source user interface definitions 211 can be viewed as IMS/VS Message Format Service (MFS) files.

Screen definitions provide structural information about the fields that compose the screen layout. Message definitions provide content information about the fields, such as the data they contain and their attributes (protected, highlighted, etc.).

Target user interface definitions 213 can take one of three forms: database files 246, a header file 247, and a GUI file 248. Database files 246 contain the set of statements necessary to populate user interface repository 152 with screen and message information for MFS file 211. In a preferred embodiment of the present invention, the database files 246 can be viewed as ANSI SQL scripts.

A deletion script removes from the user interface repository 152 any definitions for the MFS file 211. Once this repository cleanup is accomplished, an insertion script adds to the user interface repository 152 any new definitions for the MFS file 211. Consequently, the user interface conversion utility 210 can be run multiple times for the same MFS file without negative effects. In a preferred embodiment of the present invention, the user interface repository 152 is a standard RDBMS such as Oracle Server 7 from Oracle Corporation.

Information stored in the user interface repository 152 is converted at application runtime into the user interface representation structures of the presentation layer 116. The user interface engine 117 of the presentation layer 110 then maps application user interface representation structures 116 into display platform user interface representation structures 118, used by the user interface display platform 115 for display to the user. Accordingly, target user interface definitions 213 effectively constitute an intermediary user interface definition language for storage of user interface information in the user interface repository 152 and eventual user interface representation structures 118.

Header files 247 are an alternative to database files 246. In a preferred embodiment of the present invention, user interface representations are stored in the user interface repository 152 and retrieved as needed from this repository by the business process layer 120. This is an appropriate mode of storing a large amount of user interface representations on a back-end database host, thus alleviating performance and space constraint problems on the client or business process hosts. However, for smaller applications, user interface representations may not need to be stored on a separate user interface repository 152. Accordingly, a user interface converter 212 can generate a header file 247 instead of database files 246.

Such a header file 247 is then passed to the business process layer 120 to provide information necessary during application runtime operations. In this scenario, the header file 247 can be viewed as declarative statements in ANSI C that are compiled as part of the source code for the business process layer 120.

GUI files 248 are used by application developers and maintenance personnel to modify application screens and messages as part of the re-engineering system 30. In a preferred embodiment of the present invention, the GUI file 248 are written in Microsoft Visual Basic. The application re-engineering process 30 then uses the GUI file to load screen information in Visual Basic, which can be viewed as the graphical user interface editor 310, make any modification in Visual Basic, resulting in a modified GUI file, and then run a Visual Basic to Oracle conversion process as described regarding the graphical user interface editor 310 to load the modified GUI file into the user interface repository database 152, ready for usage by the application.

The user interface conversion utility 210 calls the user interface converter 212 to generate the "target" representation just described. In a preferred embodiment of the present invention, the user interface converter 212 is an ANSI C program, which takes a MFS file as an input and generates output files. To perform this function, the user interface converter 212 can be structured using conventional compiler technology, including a scanner 241, a parser 243, and a code generator 245.

Specifically, the scanner 241 reads characters from the MFS file until a token has been read. The scanner 241 adds the token just obtained to a symbol table in which all the identifiers of the source language are stored, along with their characteristics. The tokens are then passed to the parser 243.

The parser 243 can be viewed as a function that parses the statements of the source language. In this context, the delimiter that enables the user interface converter 212 to determine when the end of a statement has been reached is defined by the particular syntax of the source. Once a statement has been parsed, the parser 243 calls another function, which returns the type of the statement that has just been parsed. This type is then passed to the code generator 245.

The code generator 245 can be viewed as a large switch that, given a statement type, calls the appropriate function to generate "target" code for this statement. The code generator 245 relies on a library of functions that handle the actual code generation for the entire set of statements of the source language. One such library exists for each source language, with ANSI SQL, ANSI C, and Microsoft Visual Basic as the target languages.

Figure 17:
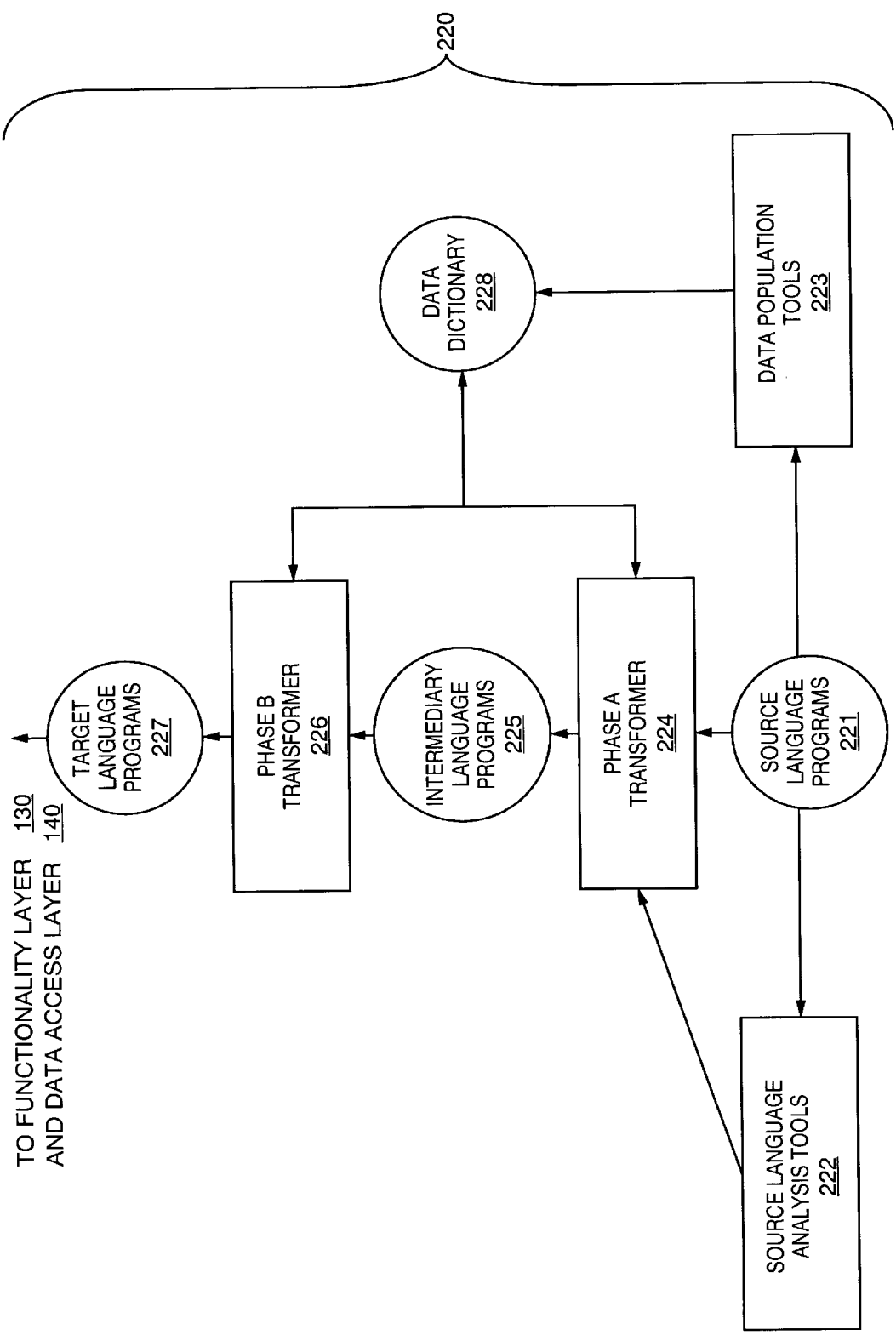
FIG. 17 is a flow diagram of the procedural language conversion utility 220 of FIG. 1.

FIG. 17 is a flow diagram of the procedural language conversion utility 220 of FIG. 1. The procedural language conversion utility 220 converts the functionality and data access programs of an existing application into the programming language targeted for the implementation of the functionality layer 130 (FIG. 1). This conversion process consists of two main phases. A first phase (Phase A) converts the source language 221 into an intermediary language 225. A second phase (Phase B) then transforms the intermediary language 225 into the final target language 227.

The first transformation is executed by a first phase (Phase A) transformer 224, customized for each source language environment 221. The intermediary language 225 is a meta language designed to facilitate application maintenance.

The meta language is independent of source and target languages and supports the use of an independent data dictionary 228. The data dictionary 228 generation is preferably achieved through the use of data population tools 223, which use constructs in the source code and related data files.

The meta language is used as the target for the conversion of numerous source languages, and in turn can be transformed into multiple different target languages. The meta language is converted to a target language using a second phase (Phase B) transformer 226. There is a specially customized second phase transformer program 226 for each target language environment 227. The procedural language conversion utility 220 as a whole is applicable to batch as well as on-line applications.

FIG. 18 is an exemplary source code fragment 221'. As illustrated, the source code fragment includes assignment statements 221-A, 221-C, 221-E, 221-F, 221-H, conditional-branch statements 221'-B, 221'-G, 221'-J, 221-K, 221-M, jumps, 221-D, 221-L function calls 221-I, 221-N, and labels 221-0. The assignment and conditional branch statements can use variable values or literals.

Figure 19:
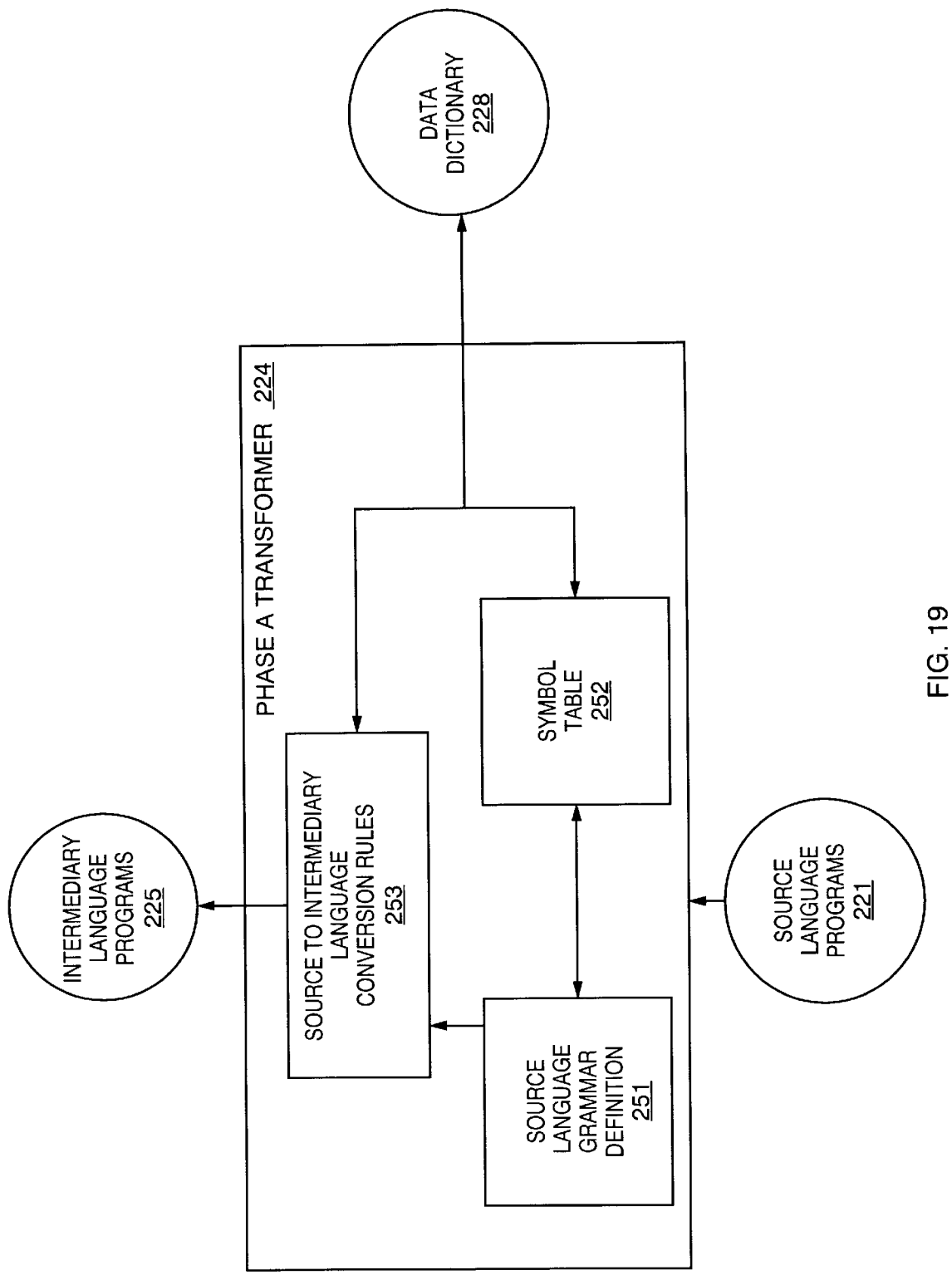
FIG. 19 is a block diagram of the first phase transformer program 224 of FIG. 17.

FIG. 19 is a block diagram of the first phase transformer program 224 of FIG. 17. As shown, the main elements of this transformer are a grammar definition for the source language 251, a dynamic symbol table generator for the source language 252, and a number of rules 253 for transforming a source language 221 to the meta language 225. In addition, an external data dictionary 228 contains the data structures, definitions, and common logic constructs pertaining to the source application.

In terms of control flow, the first phase transformer 224 receives a file of source language code 221 as input. This file is then semantically parsed using the source language grammar definition 251. A full grammar for the source language is specified using a programmatic grammar encoding scheme.

The symbol table 252 is dynamically generated during parsing based on data definitions found in the source code 221 as well as in the data dictionary 228. All relevant data (i.e. non-procedural) elements found in the source code 221 are incorporated into the symbol table 252, while irrelevant elements are discarded based on source language grammar 251. The symbol table 252 is thus dynamically built to contain symbols for all data elements, data structures, data definitions and variables relevant to the source code file 221 being transformed.

Figure 20A:
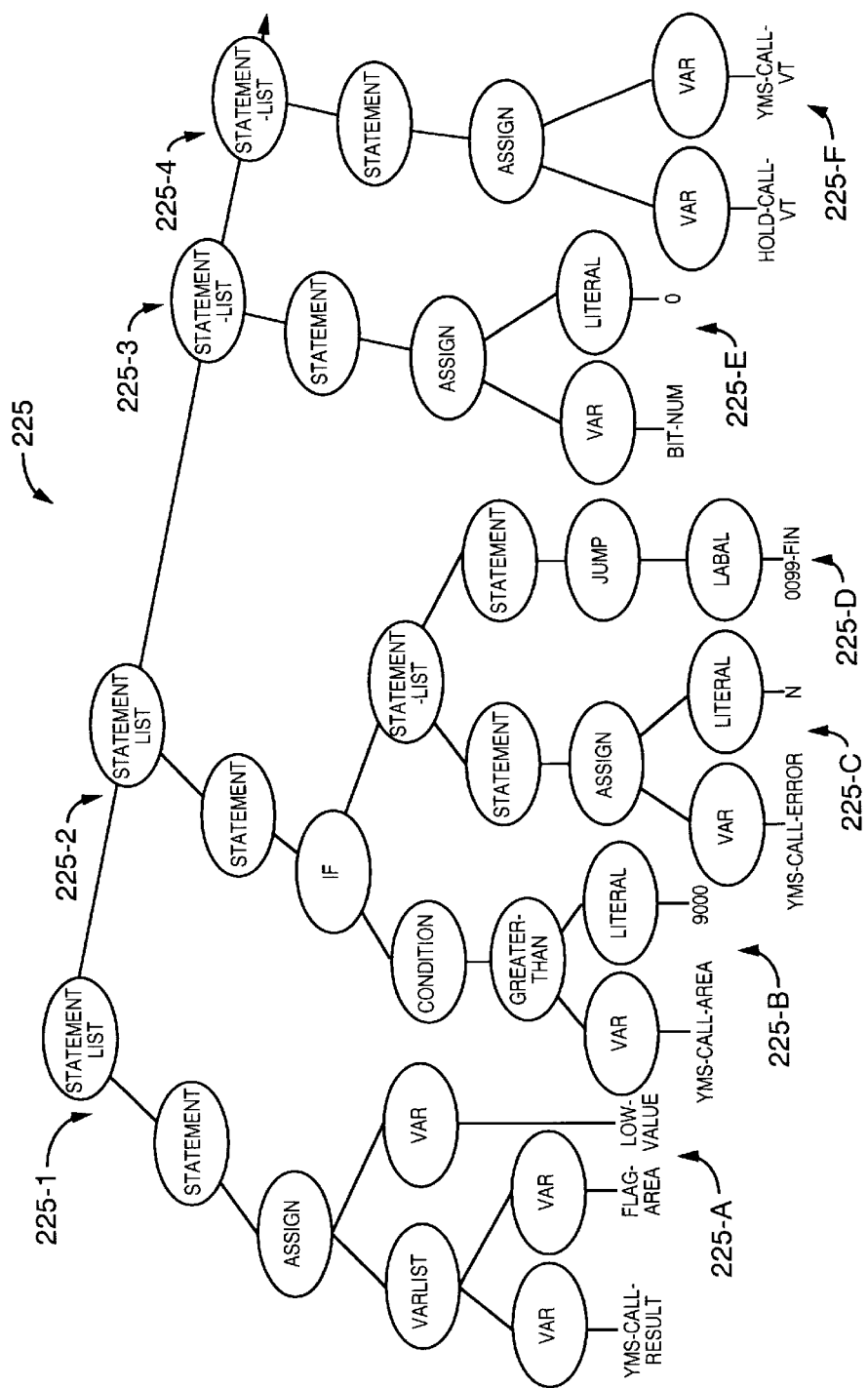
FIG. 20 illustrates in FIGS. 20A–20B a parse tree for the source code fragment of FIG. 18.
Figure 20B:
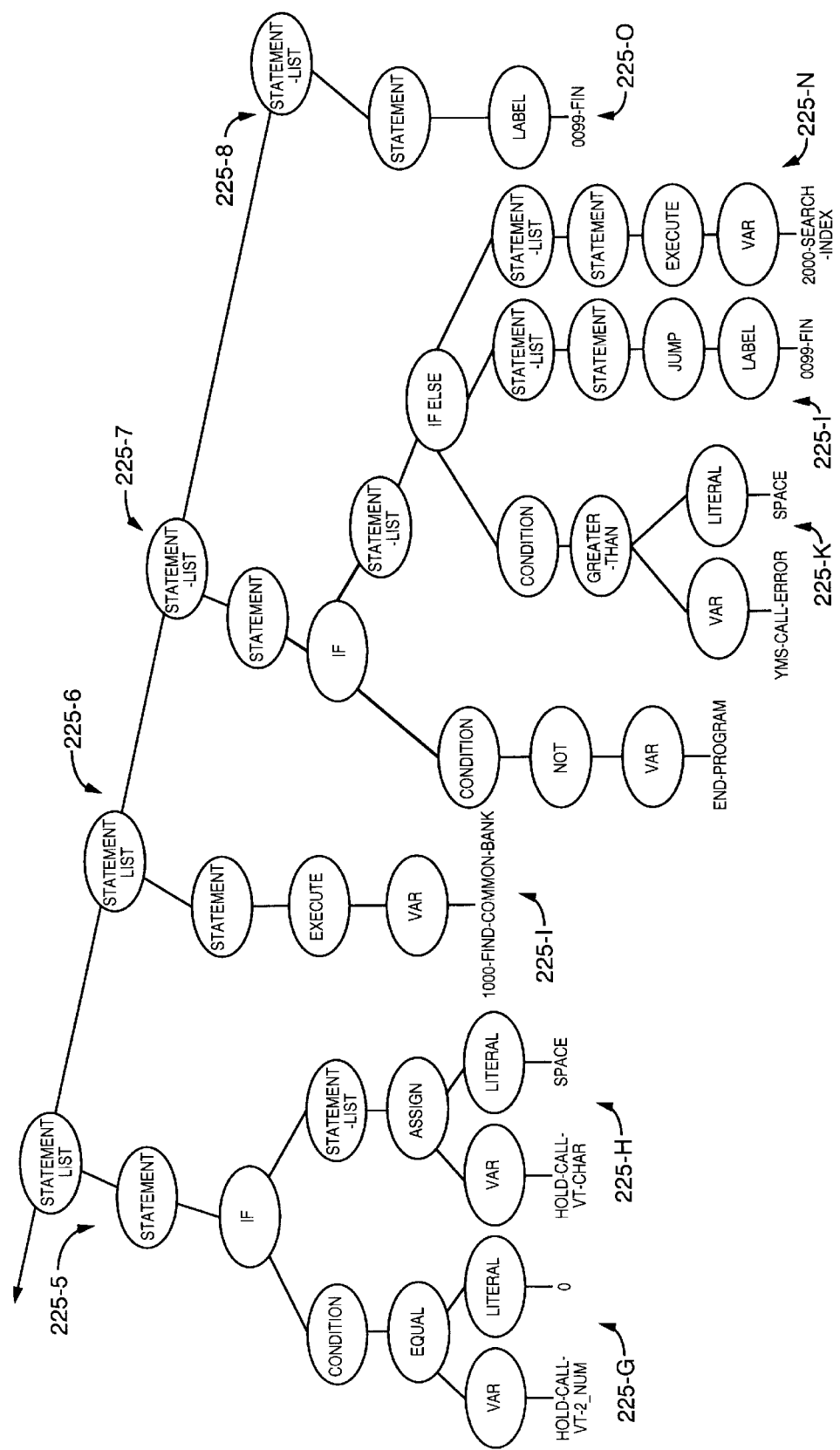

FIG. 20 illustrates in FIGS. 20A–20B a parse tree for the source code fragment of FIG. 18. As illustrated, the source code 221 is parsed into a series of statement lists 225. Each statement list includes at least one statement. A statement can include an additional statement list. For example, the first instruction 221-A (FIG. 18) is parsed into an assignment (ASSIGN) which assigns the variable (VAR) LOW-VALUE to the variable list (VARLIST) of variables (VAR) YMS-CALL-RESULT and FLAG-AREA. Each source language instruction 221-A, . . . , 221-0 of FIG. 18 is represented as a respective branch cluster 225-A, . . . , 225-0 on the parse tree 225 of FIG. 20. The branch clusters are on branches 225-1, . . . , 225-8 of the parse tree 225. From this representation, the source language is converted to the intermediate language.

Once parsing is complete, a complete set of rules 253 for transforming source language code to meta language code is programmed as declarative rules in a separate conversion routine 253. The conversion rules 253 operate as follows. A rule is applied to each source language construct parsed using the grammar 251. When a rule is executed, a source language construct is transformed to its equivalent construct in the meta language. Procedural constructs and primitives are thus regenerated in the meta language. Operations on data elements and data structures are first validated using the symbol table 252. Based on this validation, an equivalent operation is custom-generated in the meta language. The rule being executed for this validation operation generates a specific construct to reproduce the semantics of the transformed operation, such as a conversion from integer to floating point, if required.

In addition to procedural constructs and data elements and structures, a subset of the rules specializes in the extraction and transformation of external data access commands into application-independent external data access commands. In a preferred embodiment of the present invention, application-independent external data access commands could be encoded using the ANSI-SQL language. External data access operations are thus parsed and transformed into separate, application-independent data access commands. These generated data access commands are stored in at least one separate output file.

FIG. 21 is an intermediate language file 225' for the source code fragment of FIG. 18. The file 225' is created by traversing the parse tree 225 depth-first, left-to-right. A node is not output to the file 225' until all children are output. This technique results in a reverse polish or postfix notation. As illustrated, each branch 225-1, . . . , 225-8 of the parse tree 225 is represented as a statement 225-1', . . . , 225-8' in the file 225'. The trunk nodes of the parse tree 225 are represented as a terminal statement 225-9'.

In summary, executing the transformation rules on the source code produces two separate outputs: the transformed source code in a meta language, which is constituted of procedural source code and data definition structures, and a set of data access command.

Figure 22:
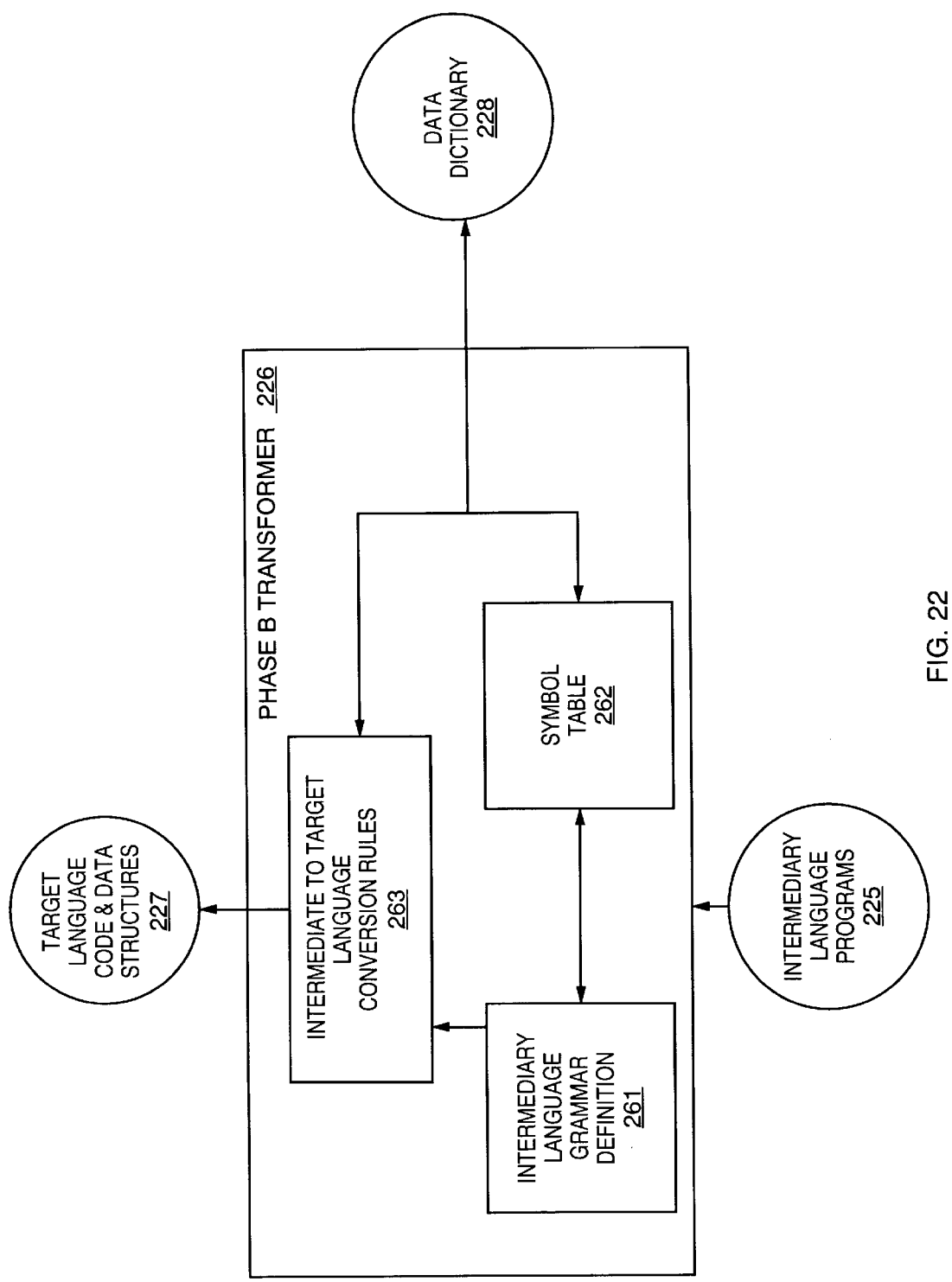
FIG. 22 is a block diagram of the second phase transformer program 22 of FIG. 17.

FIG. 22 is a block diagram of the second phase transformer program 226 of FIG. 17. Similar to the first phase transformation, the main elements of the second phase transformer 226 are a grammar definition 261 for the meta language 225, a dynamic symbol table generator 262 for the meta language 225, and a number of rules 263 for transforming the meta language 225 to a target language 227. In addition, the second phase transformer program 226 uses the same external data dictionary 228 as does the first phase transformer program 224.

In terms of control flow, the second phase transformer 226 receives as input meta language program files 225, usually constituted by meta language procedural source code and data definition structures files, as well as data access command files, both generated by the first phase transformer 224. The meta language program files 225 are then semantically parsed using the meta language grammar definition 261. A full grammar for the meta language is specified using a programmatic grammar encoding scheme.

The symbol table 262 is dynamically generated during parsing based on data definitions found in the meta code 225 as well as in the data dictionary 228.

The data access command files portions of the meta language program files 225 provided as input are parsed using a different mechanism. Because this mechanism is a simplified version of the one used for procedural source code and because it is based on the exact same principles, it will not be detailed any further here.

Upon completion of parsing, a complete set of rules 263 for transforming the meta language code 225 to the target language code 227 is programmed as declarative rules in a separate conversion module 263. The conversion rules 263 includes rules for transforming meta language data definitions into target language data structures, rules for transforming meta language variable definitions into target language variables, rules for generating target language initialization routines for the data structures and variables mentioned above, rules for transforming procedural meta language source code into target language source code, and optionally rules for customizing the application-independent data access commands for a particular application such as Oracle. A rule is applied to each language construct parsed using the meta language grammar 261.

Language constructs include: data definitions, variable definitions, and procedural constructs. Data definitions in meta language code are transformed into target language data structures by executing a set of rules written for this purpose. Variable definitions in meta language are also transformed into target language variables by executing a set of rules written for that purpose. For each variable definition created, an initialization routine is created. Procedural constructs are transformed into their equivalent in the target language. Data access commands can be tailored for a particular application as required by the target environment. Executing the transformation rules on the meta language source code produces output files containing the transformed code in the target language: procedural source code files, data definition structure files, and final data access command files.

The target source code 227 includes calls to specially designed and implemented libraries to support functionality that is not provided natively in the new target environment. These functions include variable handling, value assignment, data access services, transaction processing, and other. Depending on the target environment, different runtime libraries are required in order to guarantee correct execution in the new environment. The scope of these libraries is determined not only by the target environment, but also by the source environment. All source constructs must be mapped to equivalent constructs in the target environment.

Figure 23B:

FIGS. 23A–23B are C and C++ target code fragments 227', 227", respectively, for the source code fragment of FIG. 18. As illustrated, the intermediate language illustrated in the output file 225' of FIG. 21 is transformed into a select target language source code 227. The target language can be any procedural programming language (such as C) or any object-oriented programming language (such as C++). As described, a different second phase transformer program 226 is used to generate source code in each target language.

Together with the transformation of the code to the target environment, the transformation process permits new data organization methods. If new methods are used to organize data, additional libraries might be required to achieve complete compliance with the original application behavior. An example of specialized library for IMS/VS data organization method was outlined above in the context of the data access layer 140.

In addition to the transformed code and required libraries, a runtime infrastructure must be provided for application execution. The infrastructure in question corresponds to the multi-tiered architecture 10 detailed above. Because the description of the architecture 10 focused on on-line programs, a number of key differences should be noted in its application to the batch components of applications. Batch-related code modules only interact with their calling process, eliminating the need to maintain a two-way communication structure with the user interface module and the accompanying state information in the business layer. Instead, re-architected batch processes are stand-alone programs constituted by a wrapper that provides means to parse the input arguments and call the top-level batch job. Typically, this top-level batch job requires some form of job scheduling infrastructure. As an example, legacy Job Control Language (JCL) can be converted to a scripting language-equivalent such as UNIX shell, Perl, or REXX. The resulting script then calls the various batch programs, interleaved with scripting commands or library calls that provide functionality that is similar to that of the source legacy system. In spite of these differences, batch conversion and processing follows the same fundamental principles as on-line, in a simplified manner. Consequently, a full discussion of the specifics of batch conversion and runtime execution will not be detailed any further.

Figure 24:
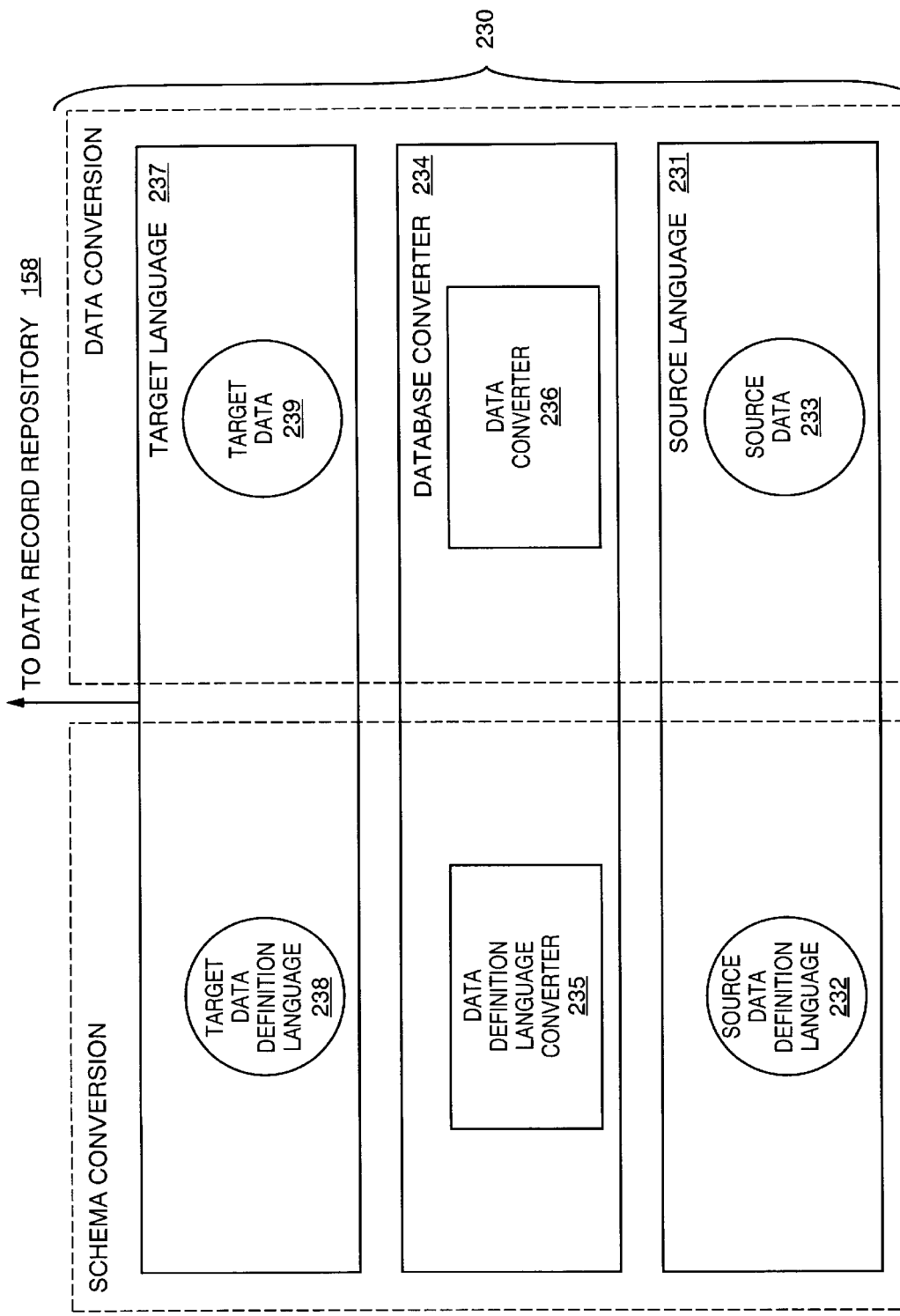
FIG. 24 is a block diagram of the data definition language conversion utility 230 of FIG. 1.

FIG. 24 is a block diagram of the data definition language conversion utility 230 of FIG. 1. The database conversion utility 230 is used to convert a source database language 231 into a target database language 237 using a database converter 234. As illustrated, the conversion must address the database structure, encoded using a Data Definition Language (DDL), and referred to as a schema, as well as the database data.

In a preferred embodiment of the present invention, the target DDL 238 is a relational database schema specified using conventional ANSI SQL language. Such a schema defines the tables that compose an application, along with their key fields, and other descriptive fields. Initial values and other constraints such as referential integrity clauses may also be included in this schema. Because relational schemas are well understood, and ANSI SQL syntax is well-documented, the primary task of the DDL converter 235 is to map the syntax of source DDL 232 to the corresponding ANSI SQL syntax. In a preferred embodiment of the present invention, this "target" DDL 238 can be viewed as an intermediary language that can then be converted to the final target DDL language for increased maintainability and flexibility, as was the case with the user interface and procedural language conversion utility. For illustrative purposes, IMS DL/1 can be considered as the source DLL 232.

Figure 25:
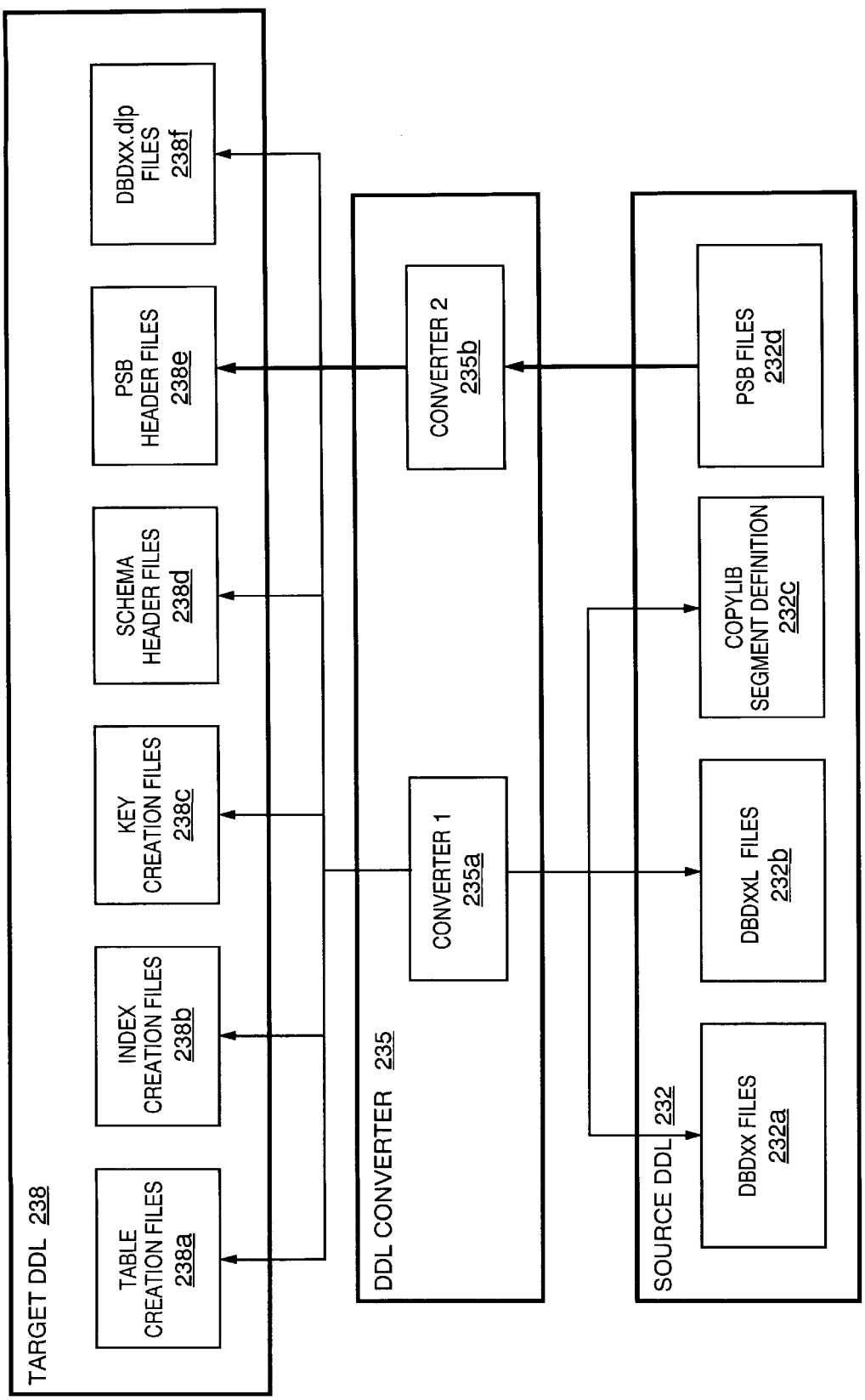
FIG. 25 is a block diagram illustrating a schema conversion.

FIG. 25 is a block diagram illustrating a schema conversion. As shown, the DDL converter 235 is sub-divided into a first converter 235a and a second converter 232b. The first converter 235a takes DBDxx 232a, DBDxx 232b, and COPYLIB 235c as inputs and generates a table creation SQL statement file 238a, an index creation SQL statement file 238b, a primary key creation SQL statement file 238c, and a database schema ANSI C header file 238d.

By way of background, an IMS database schema depends on Data Base Descriptions (DBD) and COBOL copy libraries (COPYLIB). All IMS data bases must be defined through DBD generation prior to use by application programs. A DBD is the DL/1 control block that contains all the information necessary to describe a data base, namely segment types, physical and logical relationships between segment types, database organization and access method, and physical characteristics of the database. COPYLIB contains COBOL data structures definition and is used to create corresponding C structures and IMS segment definitions.

The first converter 235a generates a table file 238a, which is used to create tables in the target RDBMS. The table file 238a includes simple relational table creation statements, without indices, keys, or reference integrity. Consequently, it an be generated directly from COPYLIB 232c information, without any DBD input. For example, the COPYLIB entry for a segment is used to generate a corresponding relational table.

A relational table is build from an IMS segment as follows. First, all the key fields of all the ancestors of the segment in question in the IMS hierarchy are included in the relational table into which the segment in question is being converted. Then, all the local key fields of the segment being converted are included in the target relational table. Finally, all the local non-key fields of the segment to convert are added to the target relational table.

The first converter 235a also generates the index file 238b and the primary key file 238c, which are derived from the table file 238a. The first converter 235a creates one index for each parent of the converted segment by concatenating the keys for that parent. One index is also created for each local key field.

The first converter 235a also creates the schema header file 238d having information for each segment using the DBDxx 232a and corresponding DBDxxL 232b to provide schema information to application programs. Preferably, a segment header file includes two ANSI C data structures: a segment and a segment array. The segment structure includes the following information: a segment name, the names of the segment columns, the segment child index in the form of another header file, the length of each segment column, the expanded column length, the PIC mask for each segment column indicating column type and size, the column usage, a logical key and the corresponding local key index, the number of columns in the segment, the number of parent keys in the segment, and the number of local keys for this segment. The segment array structure includes the following information: a segment name, physical child names, the number of children, a logical flag, and a pointer to the corresponding segment data structure.

In addition to the first converter 235a, the second converter 235b is used to convert PSB definitions 232d into PSB header files 238e. As mentioned previously, a PSB defines the database which can be accessed, the segments within the database which are available, and the type of access (read, update, etc.) which can occur. The PSB header file 238e provides such database access information to application programs.

Figure 26:
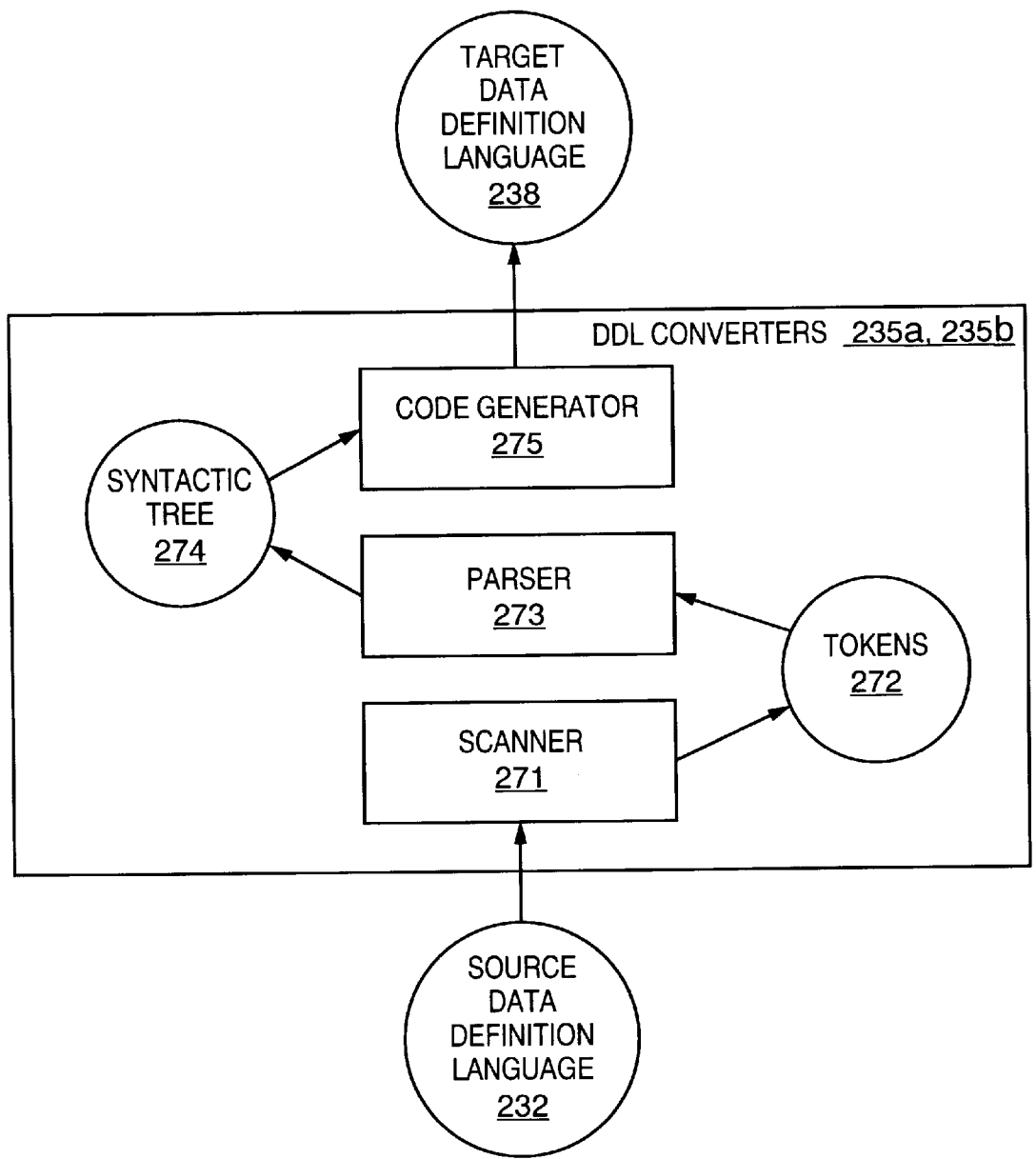
FIG. 26 is a block diagram of a converter 235a, 235b of FIG. 25.

FIG. 26 is a block diagram of a converter 235a, 235b of FIG. 25. Both converters 235a, 235b are built using the conventional principles of compiler design. This includes a scanner 271 to decompose source data definition language 232 into tokens 272, a parser 273 to assemble tokens 272 into a syntactic parse tree 274, and a code generator 275 to generate target data definition language constructs 238 from the parse tree 274. This technology is well-understood and documented in existing literature and the details of a particular compiler are highly dependent on the source and target languages. Consequently, the converters 235a, 235b will not be detailed any further.

Once the database structure is converted, the next task is to convert and load database data. In the IMS example, source data 233 is stored in a hierarchical fashion. The first converter 235a generates a data loading pattern file DBDxx.dlp 238f for a given physical DBD using DBDxx 232a and COPYLIB 232c information.

Figure 27:
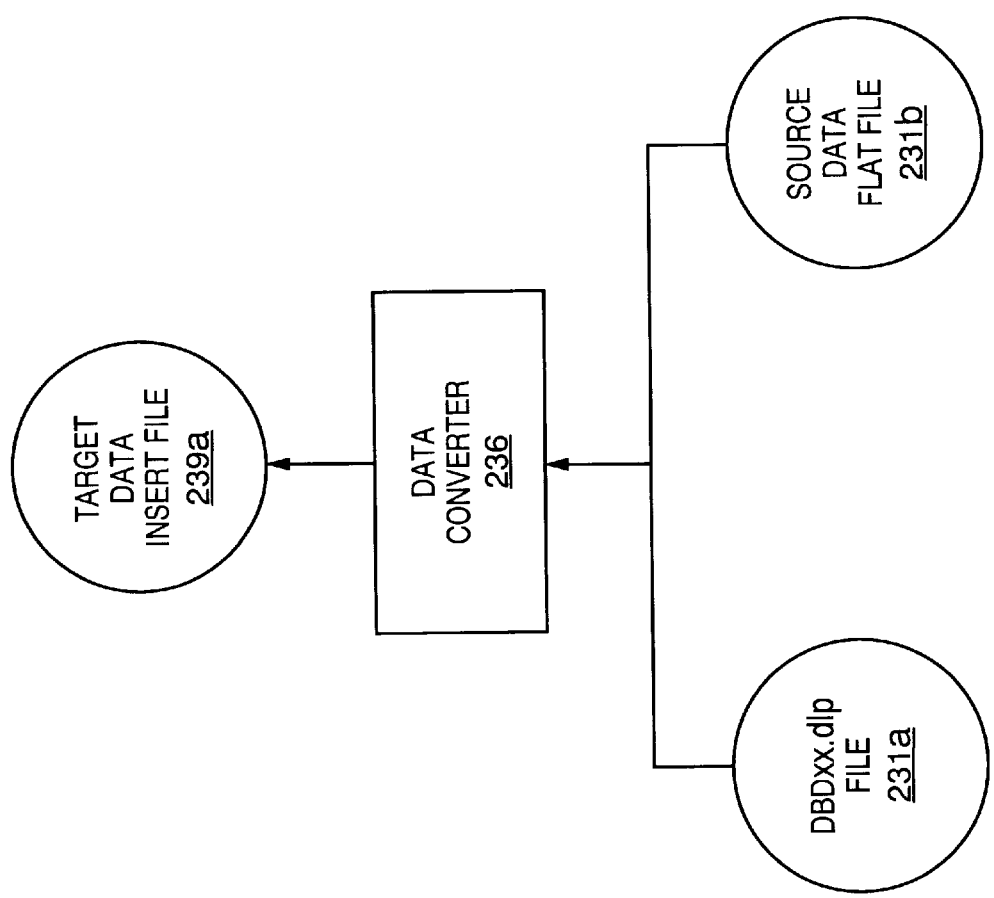
FIG. 27 is a block diagram of the data converter 236 of FIG. 24.

FIG. 27 is a block diagram of the data converter 236 of FIG. 24. A DBDxx.dlp file 231a is provided as input to the data converter 236, along with a flat file 231b that contains the data to be converted. The data converter 236 uses the data loading pattern specified in the DBDXX.dlp file 231a to determine the desired target format for each data record in the data flat file 231b and generate an ANSI SQL file 239a containing the INSERT statements necessary to populate the target database with the data provided.

The data converter 236 needs to take into account a number of technical issues in performing its task on IMS data, including packed data handling and field redefinition. In IMS, some numerical field are compressed into a binary representation for storage efficiency. Such packed data still present in binary format in data flat files 231b, is first unpacked and then moved to the end of the record, before using a filler, namely clearing the packed data original positions with blanks. When a data loading pattern file 231a specifies packed data fields, the data converter 236 searches the end of the record instead of the original field position to locate the proper data in unpacked format.

Another peculiar situation arises with redefined fields. COPYLIB 232c sometimes specifies a redefinition for one or more fields. Such re-definitions are ignored and left to the functionality code to handle. When redefined fields include packed data however, the data converter 236 creates one filler for each redefine after moving all unpacked data for the redefine in question to the end of record. Combination between re-definitions and packed data fields is thus treated as a special case of the latter.

Once all conversion is complete and all output files are available, the order of creation for a given target database table is first to create the table using the table creation file 238a, next load the data from the target data 239, then create the primary key using the primary key creation file 238c, and finally to create the indices from the index creation file 238b. Once the target database structure is established and all database data is loaded, the ANSI C structures in the schema header file 238d and the PSB header file 238e are used at runtime by application programs to access the target database structures.

As mentioned previously with regard to FIG. 1, the custom and re-engineering system 30 focuses on providing an enterprise a facility for maintaining and enhancing distributed infrastructure. Even though this facility is an integral part of the overall system of the present invention, it is really an add-on facility that becomes paramount once the transition is complete. Consequently, only an overview of the custom and re-engineering system 30 will be provided here. At a high-level therefore, the custom and re-engineering system 30 includes a graphical user interface editor 310, a graphical business process editor 320, a graphical business object editor 330, a graphical data record editor 340, a logic development environment 350, and facilitation tools 360.

The graphical editors 310, 320, 330, 340 are preferably fourth generation languages (4GL) or Computer Aided Software Engineering (CASE) tools that facilitate the application development task by enabling a certain amount of the application code to be generated automatically from graphical representations. In particular, the graphical user interface editor 310 can be a commercially available user interface display platforms or GUI builders discussed in the context of the presentation layer 110.

Figure 28:
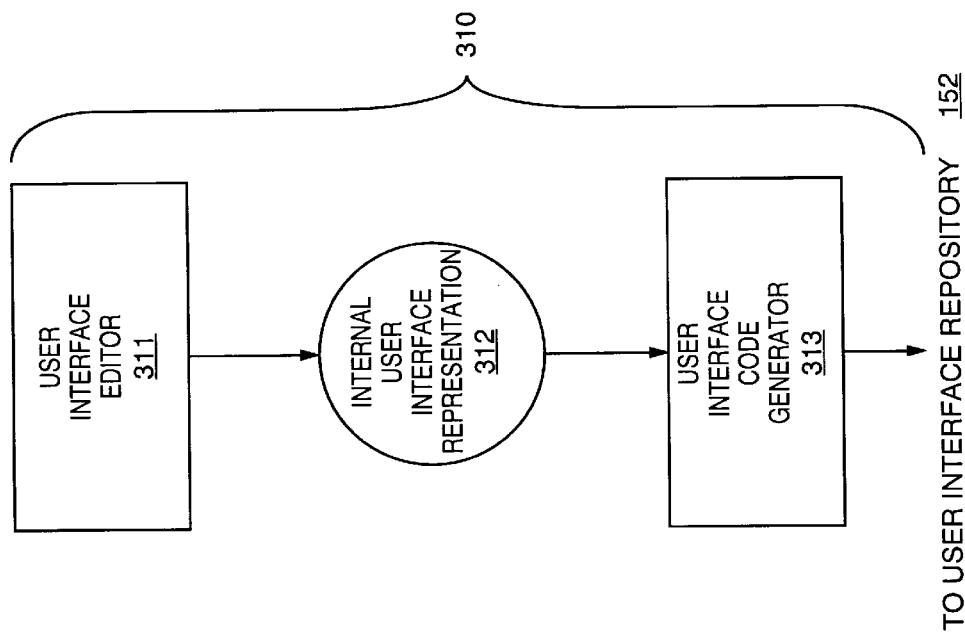
FIG. 28 is a block diagram of the graphical user interface editor 310 of FIG. 1.

FIG. 28 is a block diagram of the graphical user interface editor 310 of FIG. 1. The graphical user interface editor 310 is a typical user interface made to create menus and paint screens. As such, the graphical user interface editor 310 includes a screen editor 311 to position graphical representations of business objects on a screen or form. Screens can thus include text fields, labels, buttons, selection boxes, pull down lists, and similar graphical objects that compose a user interface. These graphical representations of business objects can be grouped so that a screen can be composed of sub-screens. This is useful to represent screen overlays, which are screens that have a fixed area as well as a variable area that changes depending on user actions. Sub-screens are also useful for grouping together business objects that need to be displayed across a number of application screens. The screen editor 311 creates internal user interface representations 312 which are processed by a user interface code generator 313 into data stored in the user interface repository 152.

Figure 29:
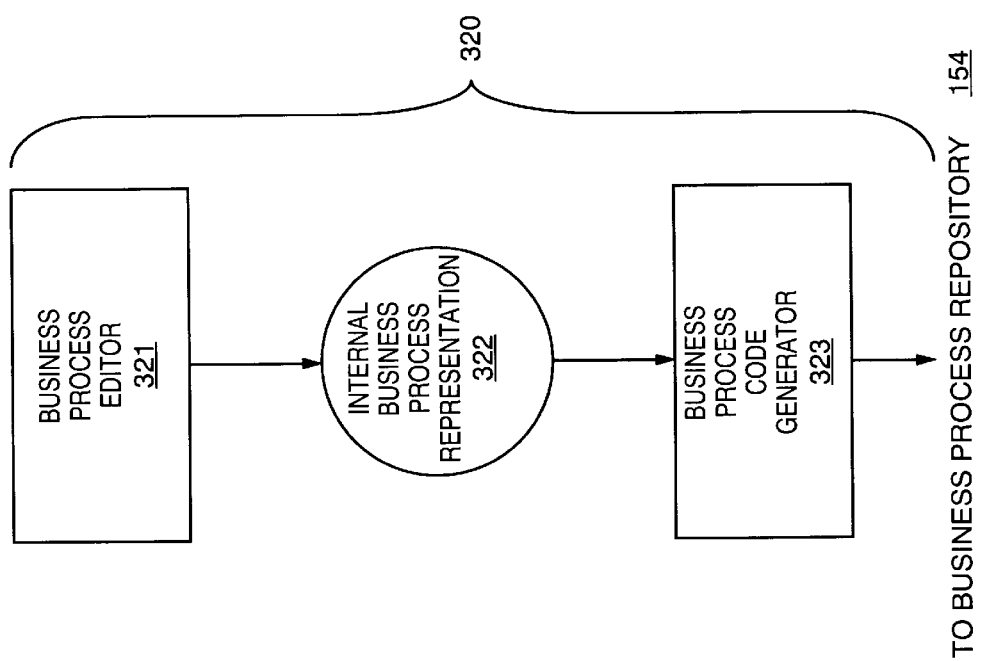
FIG. 29 is a block diagram of the graphical business process editor 320 of FIG. 1.

FIG. 29 is a block diagram of the graphical business process editor 320 of FIG. 1. The graphical business process editor 320 is a tool that enables application developers to represent the business processes that an application is meant to automate in a more intuitive, graphical form, referred to as a process flowchart. Because a business process can be broken down into sub-processes, an application can be viewed as a hierarchy of process flowcharts. This modularization enables an application to look at high-level business processes separately from detailed business sub-processes. As illustrated, a business process editor 321 generates internal business process representations 322, which are converted by a business process code generator 323 into data stored in the business process repository 154.

In a preferred embodiment of the present invention, process flowcharts can be viewed as conventional transition diagrams. Transition diagrams are networks of nodes represented graphically by circles and are called states. The states are connected by directed labeled arrows, called edges. Edge labels represent the transformations that lead from one state to the next.

As an example, the process of applying for a driver's license includes routing a driver's license application paper form through the various departments in charge of eye exams, written test, driving test and the like, with a progression from department to department. This process can be modeled using a transition diagram in which the states represent the various departments, and the edges represent the changes to the electronic driver's license form that need to be performed before that form is routed to the next department.

A transition diagram can be deterministic, or non-deterministic, where non-deterministic means that more than one edge with the same label is possible out of a state. In a preferred embodiment of the present invention, non-deterministic transition diagrams are used to represent business processes graphically. These non-deterministic transition diagrams constitute a process representation perfectly suited for interpretation by business process engine 124 (FIG. 8), which, as mentioned earlier, is the event handler based on NFA theory that processes the business process flowcharts resulting from the graphical business process editor 320.

Figure 30:
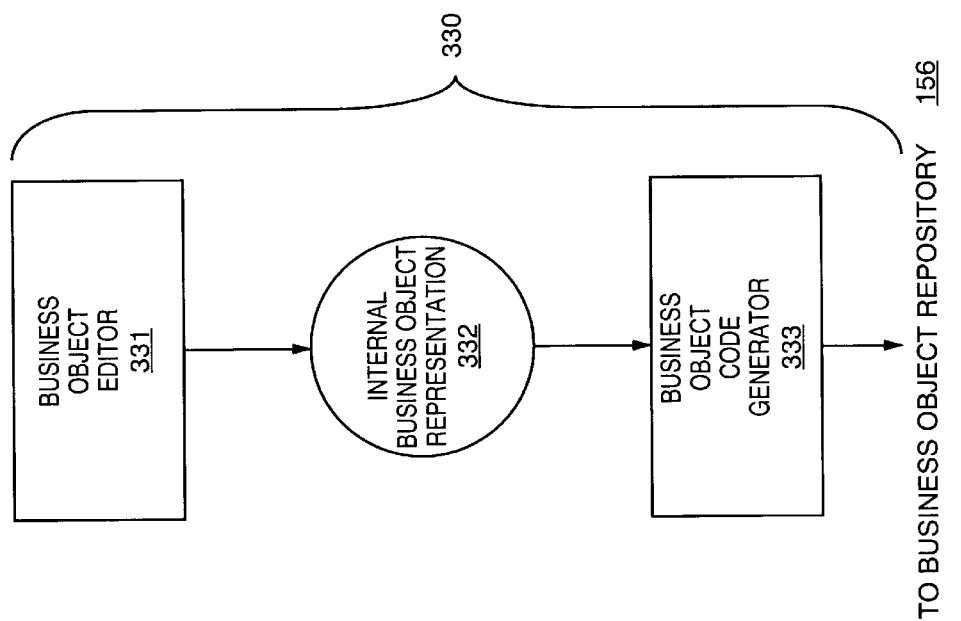
FIG. 30 is a block diagram of the graphical business object editor 330 of FIG. 1.

FIG. 30 is a block diagram of the graphical business object editor 330 of FIG. 1. The graphical business object editor 330 is a tool that enables the graphical editing of business objects and their relationships. A business object editor 331 generates internal business object representations which are converted by a business object code generator into data stored in the business object repository 156.

In a preferred embodiment of the present invention, the graphical business object editor 330 can be viewed as a Entity-Relationship (ER) diagramming tool. The ER data model is the predominant conceptual level description tool and is used as a diagramming technique where rectangles represent entities, circles represent attributes, diamonds represent relationships. This graphical ER diagram can be used to generated automatically the application database schema, and a number of the basic data accessor queries.

In addition, default constraints can be automatically associated to business objects based on the business object type. This can lead to automatic generation of maintenance screens for lookup business objects that can take a known range of values. The graphical business object editor can also be used to create templates that can be reused throughout an application. For instance, every screen may have a number of fixed function keys or buttons such as display, insert, delete, update, clear, refresh, backup, or quit, as well as a number of variable function keys whose semantics change from screen to screen. These function keys can be treated as a group and provided automatically as part of the template for every screen in an application.

Figure 31:
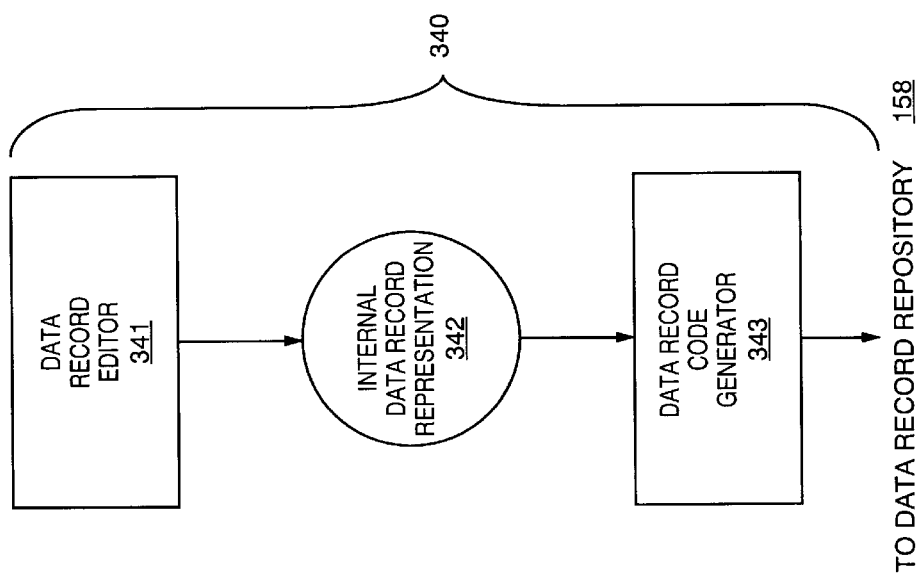
FIG. 31 is a block diagram of the graphical data record editor 340 of FIG. 1.

FIG. 31 is a block diagram of the graphical data record editor 340 of FIG. 1. The graphical data record editor 340 is a tool that provides access to the data stored in the relational tables of the data layer RDBMS. As such, it is an interface that provides graphical access to each application table and permits the application developer or maintainer to view, insert, delete or update specific data records. As illustrated, a data record editor 341 generates internal data record representations 342 which are converted by a data record code generator 343 into data stored in the data record repository 158.

This focus on application data is complemented by an ability to manipulate DDL structures. In this function, the data record editor can be viewed as a data repository used to generate the database schema, either initially in its totality, or subsequently, for incremental updates. In this regards, the data record editor is similar to commercially-available off-the-shelf packages such as PeopleSoft Inc.'s Record Editor or ERwin from Logic Works Corporation. As a whole, the data record editor greatly facilitates application maintenance and data error recovery for day to day application development, maintenance, and operation.

Figure 32:
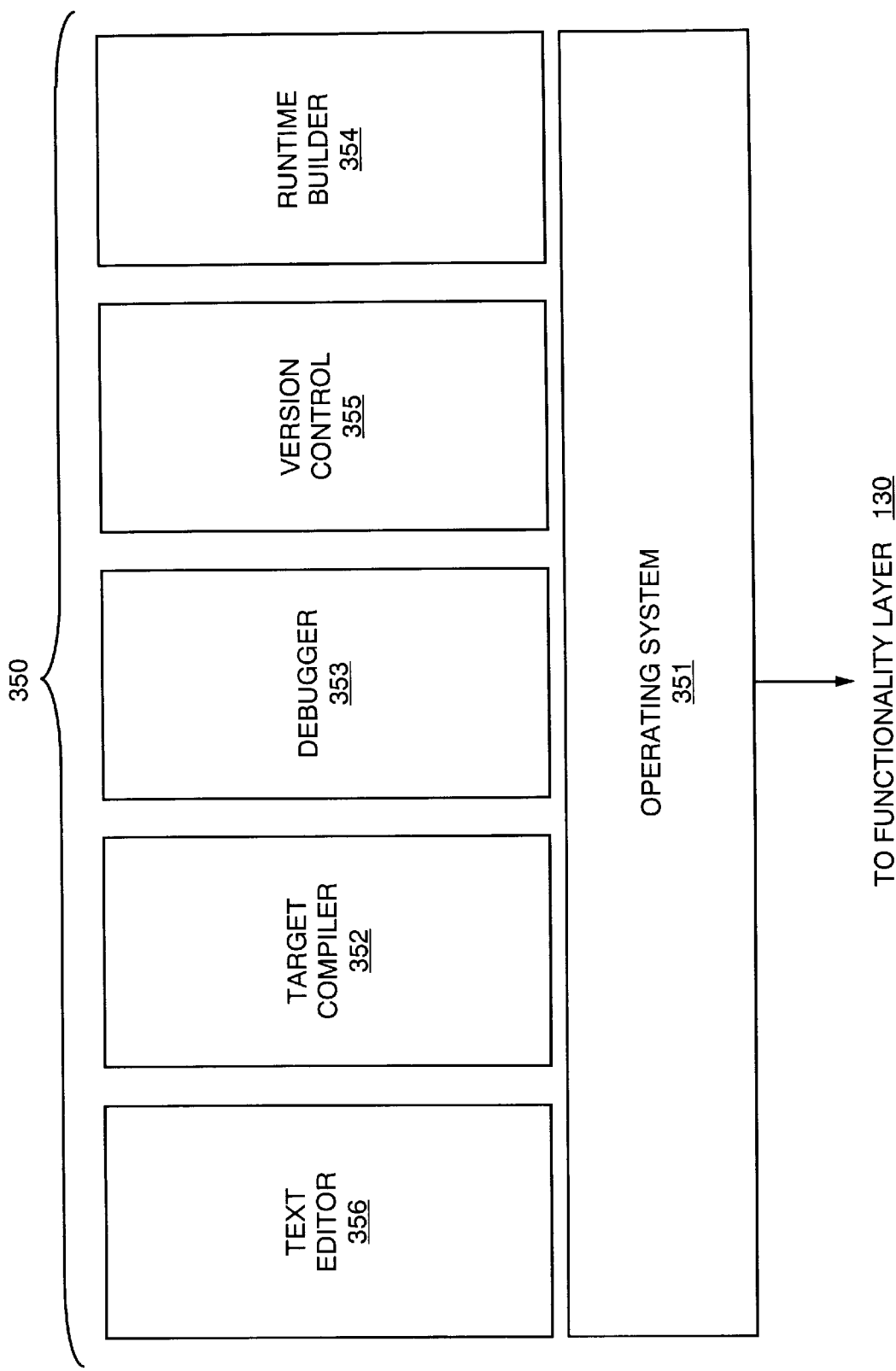
FIG. 32 is a block diagram of the logic development environment 350 of FIG. 1.

FIG. 32 is a block diagram of the logic development environment 350 of FIG. 1. The logic development environment 350 is an environment that adheres to the "open system" standards. As defined herein, an open system is a system that implements sufficient open specifications for interfaces, services, and supporting formats to enable properly engineered application software to be ported across a wide range of systems with minimal changes, to interoperate with other applications on local and remote systems, and to interact with users in a style which facilitates user portability. Open specifications are defined herein as a public specification that is maintained by an open, public consensus process to accommodate new technology over time and that is consistent with standards.

Functionality, the logic development environment 350 includes, at a minimum, an operating system 351, a third generation programming language compiler 352 and debugger 353, a runtime building facility 354, a source control system 355, and a screen oriented text editor 356. One possible embodiment of the logic development environment could use the UNIX operating system, the ANSI C programming language, the XDB debugging facility, the MAKE build utility, the RCS revision control system, and the EMACS text editor.

Figure 33:
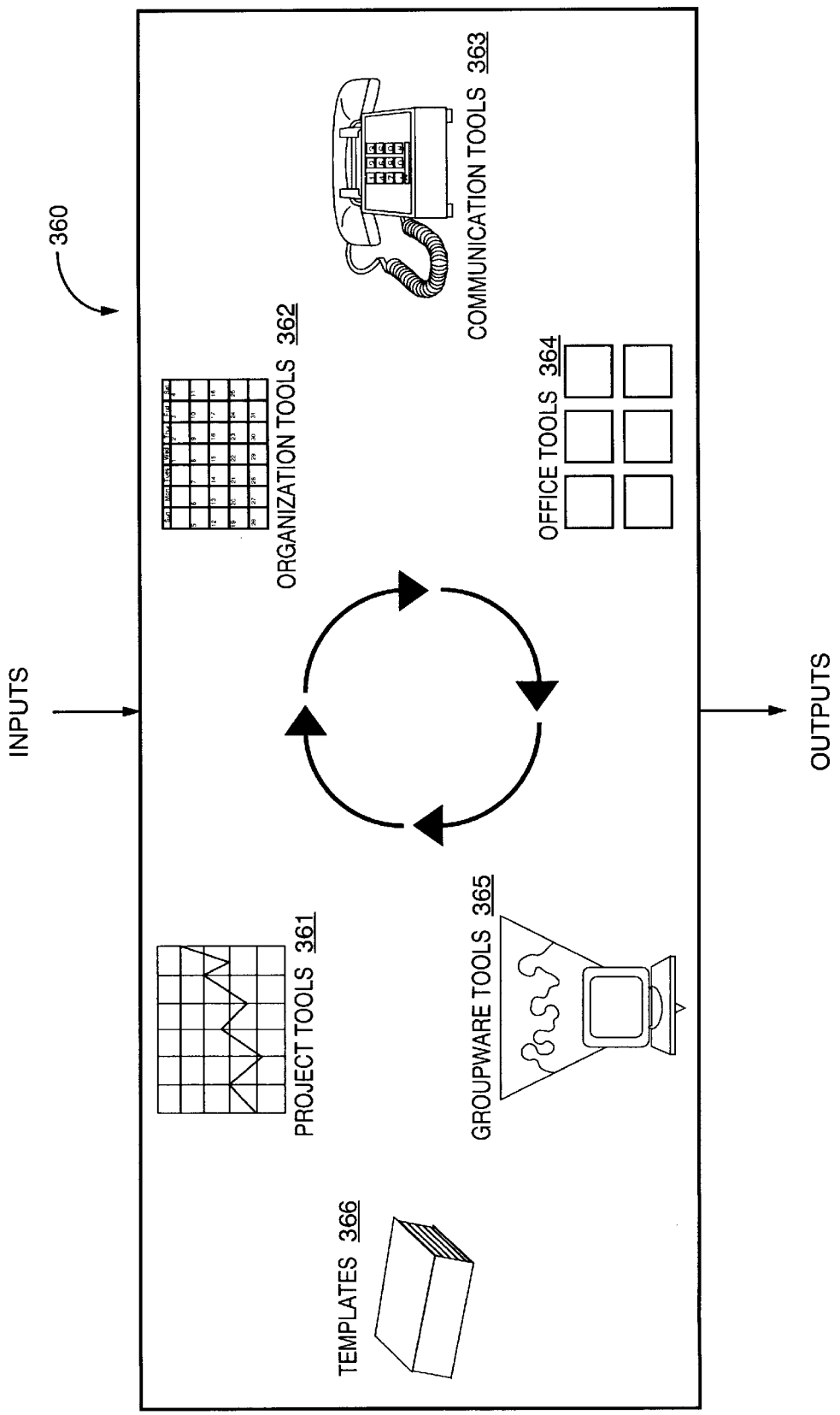
FIG. 33 is a schematic block diagram of the facilitation tools 360 of FIG. 1.

FIG. 33 is a schematic block diagram of the facilitation tools 360 of FIG. 1. The facilitation tools 360 are graphic editing tools. The primary concept is to provide a structured, yet flexible, methodology for gathering user and application requirements while enabling the use of the resulting documentation to automatically generate a number of the architectural constructs that would otherwise have to be encoded manually. These facilitation tools 360 can include project tools 361, organizational tools 362, communication tools 363, office tools 364, groupware tools 365, and templates 366 for processing user inputs.

Equivalents

While this invention has been particularly shown and described with reference to preferred embodiments thereof, it will be understood by those skilled in the art that various changes in form and details may be made therein without departing from the spirit and scope of the invention as defined by the appended claims. In particular, the invention is not limited to particular communications links, protocols, data structure formats, etc. In addition, although various features of the invention are disclosed as being either hardware or software, it is understood that any feature of the invention can be embodied in hardware, software or firmware.

These and all other equivalents are intended to be encompassed by the following claims.

What is claimed is:

1. A system to transition legacy applications operable on a legacy computing system to a distributed infrastructure, the system comprising:
    a multi-tiered computer architecture including a process control tier for modeling an internal work flow of an enterprise and a functionality tier for performing work in accordance with the work flow of the enterprise; and
    a legacy application inoperable on the multi-tiered computer architecture and
    an automated converter to transition the legacy application to a target application operable on the multi-tiered computer architecture.

2. The system of claim 1 wherein the multi-tiered computer architecture is a client-server architecture having at least four tiers.

3. The system of claim 1 where the multi-tiered architecture further includes a presentation tier for interfacing with a user, a data retrieval tier, and a data storage tier.

4. The system of claim 1 wherein the converter includes an intermediate language, the language of the legacy application being translated to the intermediate language and from the intermediate language to the language of the target application.

5. The system of claim 1 wherein the target application is an internet accessible application.

6. The system of claim 1 wherein the target application is an object-oriented application.

7. The system of claim 1 further comprising an implementation plan which provides a prioritized list of legacy applications to be transitioned by the automated converter.

8. The system of claim 7 wherein the implementation plan further provides instructions for controlling the operation of the automated converter.

9. The system of claim 1 further comprising an implementation strategy which identifies inputs to a target system and provides a list of action items for obtaining the identified outputs from the legacy computing system.

10. A method for transitioning legacy applications operable on a legacy computing system to a distributed infrastructure, comprising the steps of:
    providing a multi-tiered architecture including a process control tier for modeling an internal work flow of an enterprise and a functionality tier for performing work in accordance with the work flow of the enterprise; and
    providing a legacy application inoperable on the multi-tiered computer architecture; and
    in a computer, automatically converting the legacy application to a target application operable on the multi-tiered computer architecture.

11. The method of claim 10 wherein the step of providing a multi-tiered architecture comprises providing a client-server architecture having at least four tiers.

12. The method of claim 10 where the multi-tiered computer architecture further includes a presentation tier for interfacing with a user, a data retrieval tier, and a data storage tier.

13. The method of claim 10 wherein the step of converting comprises translating the language of the legacy application to an intermediate language and translating the intermediate language to the language of the target application.

14. The method of claim 10 wherein the target application is an internet accessible application.

15. The method of claim 10 wherein the target application is an object-oriented application.

16. The method of claim 10 further comprising the step of providing a prioritized list of legacy applications to be transitioned by the automated converter.

17. The method of claim 16 further comprising the step of controlling the operation of the automated converter based on the prioritized list.

18. The method of claim 10 further comprising the steps of:
    identifying inputs to a target system including the target application; and
    obtaining the identified outputs from the legacy applications from a list of action items.

19. In a computer, a converter for translating a legacy program component operating in a legacy language on a legacy computing system to a target program component operating in a target language on a distributed infrastructure includes a process control tier and a functionality tier, the converter comprising:
    an intermediate language;
    a first converter for translating the legacy program component from the legacy language to an intermediate component in the intermediate language wherein the legacy language is operable on a legacy processor; and
    a second converter for translating the intermediate component from the intermediate language to the target program component in the target language wherein the target language is operable on a target processor different from the legacy processor.

20. The converter of claim 19 wherein the intermediate language is independent of the legacy language and the target language.

21. The converter of claim 19 wherein the intermediate language is inoperable on either the legacy processor or the target processor.

22. The converter of claim 19 wherein the first converter parses the legacy program component into a parse tree, the intermediate component representing the parse tree in a postfix notation.

23. In a computer, a method for translating a legacy program component operating in a legacy language on a legacy computing system to a target program component operating in a target language on a distributed infrastructure includes a process control tier and a functionality tier, comprising the steps of:
    defining an intermediate language;
    in a first converter, translating the legacy program component from the legacy language to an intermediate component in the intermediate language wherein the legacy language is operable on a legacy processor; and
    in a second converter, translating the intermediate component from the intermediate language to the target program in the target language wherein the target language is operable on a target processor different from the legacy processor.

24. The method of claim 23 wherein the intermediate language independent of the legacy language and the target language.

25. The method of claim 23 wherein the intermediate language is inoperable on either the legacy processor or the target processor.

26. The method of claim 23 wherein the step of translating the legacy program component comprises:

parsing the legacy program component into a parse tree; and representing the parse tree in a postfix notation.

27. A system to transition legacy applications operable on a legacy computing system to a distributed infrastructure, the system comprising:

a multi-tiered computer architecture including a process control tier for modeling an internal work flow of an enterprise and a functionality tier for performing work in accordance with the work flow of the enterprise; and an automated converter having a first converter and a second converter to transition a legacy application to a target application operable on the multi-tiered computer architecture, the first converter translating the legacy application from a legacy language to an intermediate language and the second converter translating the translated legacy application from the intermediate language to the target application in a target language.

28. The system of claim 27 wherein the multi-tiered computer architecture is a client-server architecture having at least four tiers.

29. The system of claim 27 where the multi-tiered computer architecture further includes a presentation tier for interfacing with a user, a data retrieval tier, and a data storage tier.

30. The system of claim 27 wherein the intermediate language is independent of the legacy language and the target language.

31. The system of claim 27 wherein the target application is an internet accessible application.

32. The system of claim 27 wherein the target application is an object-oriented application.

33. The system of claim 27 further comprising an implementation plan which provides a prioritized list of legacy applications to be transitioned by the automated converter.

34. The system of claim 33 wherein the implementation plan further provides instructions for controlling the operation of the automated converter.

35. The system of claim 27 further comprising an implementation strategy which identifies inputs to a target system including the target applications and provides a list of action items for obtaining the identified outputs from the legacy applications.

36. A method for transitioning legacy applications operable on a legacy computing system to a distributed infrastructure, comprising the steps of:

providing a multi-tiered computer architecture including a process control tier for modeling an internal work flow of an enterprise and a functionality tier for performing work in accordance with the work flow of the enterprise; and in a computer, automatically converting a legacy application to a target application operable on the multi-tiered computer architecture, the legacy application translated from a legacy language to an intermediate language and the translated legacy application being translated from the intermediate language to the target application in a target language.

37. The method of claim 36 wherein the step of providing comprises providing a client-server architecture having at least four tiers.

38. The method of claim 36 where the multi-tiered computer architecture further includes a presentation tier for interfacing with a user, a data retrieval tier, and a data storage tier.

39. The method of claim 36 wherein the step of converting comprises defining the intermediate language to be independent of the legacy language and the target language.

40. The method of claim 36 wherein the target application is an internet accessible application.

41. The method of claim 36 wherein the target application is an object-oriented application.

42. The method of claim 36 further comprising the step of prioritizing a list of legacy applications to be transitioned by the automated converter.

43. The method of claim 42 further comprising the step of controlling the operation of the automated converter based on the prioritized list.

44. The method of claim 36 further comprising the steps of:

identifying inputs to a target system including the target application; and obtaining the identified outputs from the source applications using a list of action items.

45. A system for transitioning a legacy application operable on a legacy computing system to a distributed infrastructure includes a process control tier and a functionality tier, the system comprising:

an intermediate language;

a first converter for translating the legacy application component from a legacy language to an intermediate component in the intermediate language wherein the legacy language is operable on a legacy processor; and a second converter for translating the intermediate component from the intermediate language to a target application component in a target language operable on the distributed infrastructure wherein the target language is operable on a target processor different from the legacy processor.

46. The system of claim 45 wherein the intermediate language is independent of the legacy language and the target language.

47. The system of claim 45 wherein the intermediate language is inoperable on either the legacy processor or the target processor.

48. The system of claim 45 wherein the first converter parses the legacy program component into a parse tree, the intermediate component representing the parse tree in a postfix notation.

49. The system of claim 45 further comprising a multi-tiered computer architecture.

50. A method for transitioning a legacy application operable on a legacy computing system to a distributed infrastructure includes a process control tier and a functionality tier, comprising the steps of:

defining an intermediate language;

in a first converter, translating the legacy application component from a legacy language to an intermediate component in the intermediate language wherein the legacy language is operable on a legacy processor; and in a second converter, translating the intermediate component from the intermediate language to a target application component in a target language operable on the distributed infrastructure wherein the target language is operable on a target processor different from the legacy processor.

51. The method of claim 50 wherein the intermediate language independent of the legacy language and the target language.

52. The method of claim 50 wherein the intermediate language is inoperable on either the legacy processor or the target processor.

53. The method of claim 50 wherein the step of translating the legacy program component comprises:

parsing the legacy program component into a parse tree; and representing the parse tree in a postfix notation.

54. The method of claim 50 further comprising the step of operating the target program on a multi-tiered computer architecture.

* * * * *